US007934784B2

(12) United States Patent
Koga et al.

(10) Patent No.: US 7,934,784 B2
(45) Date of Patent: May 3, 2011

(54) IMAGE RECORDING APPARATUS

(75) Inventors: Yuji Koga, Nagoya (JP); Kenji Samoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 482 days.

(21) Appl. No.: 12/183,053

(22) Filed: Jul. 30, 2008

(65) Prior Publication Data

US 2009/0035018 A1 Feb. 5, 2009

(30) Foreign Application Priority Data

Jul. 31, 2007 (JP) ................................ 2007-198856
Jul. 31, 2007 (JP) ................................ 2007-199158

(51) Int. Cl.
*B41J 29/38* (2006.01)
*B41J 2/165* (2006.01)
*F16H 37/06* (2006.01)

(52) U.S. Cl. ................ 347/5; 347/16; 347/32; 74/665 L

(58) Field of Classification Search ........ 347/5; 74/665; 318/5
See application file for complete search history.

(56) References Cited

U.S. PATENT DOCUMENTS 5,926,193 A * 7/1999 Umeda .......................... 347/30
6,015,202 A * 1/2000 Hiramatsu et al. .............. 347/32
6,161,917 A 12/2000 Igarashi et al.
2005/0179713 A1* 8/2005 Waller et al. ...................... 347/9
2005/0212883 A1* 9/2005 Okamoto ...................... 347/104
2007/0048058 A1 3/2007 Koga et al.
2007/0048059 A1 3/2007 Asada et al.
2007/0057447 A1 3/2007 Asada et al.
2009/0256874 A1* 10/2009 Samoto et al. .................... 347/9

FOREIGN PATENT DOCUMENTS

EP 0476666 A2 3/1992
EP 1020296 A2 7/2000
EP 1769931 A1 4/2007
JP 2007090761 A 4/2007

OTHER PUBLICATIONS

European Patent Office; European Search Report in European Patent Application No. 08013747.4 (counterpart to the above-captioned U.S. patent application) mailed Nov. 30, 2009.

* cited by examiner

*Primary Examiner* — Matthew Luu
*Assistant Examiner* — Shelby Fidler
(74) *Attorney, Agent, or Firm* — Baker Botts L.L.P.

(57) ABSTRACT

An image recording apparatus including: a carriage on which a recording head is mounted and which is reciprocable across an image recording area and a maintenance area; driven portions; a first and a second drive source which generate drive power; and a drive-power transmitting system which transmits the drive power to the driven portions, wherein the system includes: a shaft; a first and a second switching gear supported by the shaft so as to be slidable in the axial direction, and respectively rotated by the drive power of the first and the second drive source; transmission gears each of which is meshable with at least one of the first and the second switching gear, and transmits the drive power of one of the first and the second power source to a corresponding one or ones of the driven portions; and a switching-gear positioning mechanism which positions a set of the first and the second switching gear, depending upon a position of the carriage in the areas, at a selected one of specific positions.

13 Claims, 8 Drawing Sheets

IMAGE RECORDING APPARATUS

CROSS REFERENCE TO RELATED APPLICATION

The present application claims priority from Japanese Patent Application Nos. 2007-198856 and 2007-199158, which were filed on Jul. 31, 2007, the disclosures of which are herein incorporated by reference in its entirety.

BACKGROUND OF THE INVENTION

1. Field of the Invention

The present invention relates to an image recording apparatus configured to record images while reciprocating a recording head with a carriage, and more particularly to an image recording apparatus in which drive power of a plurality of drive sources is transmitted to a plurality of driven portions.

2. Description of the Related Art

There is conventionally known an ink-jet printer as an image recording apparatus in which ink is ejected on the basis of input signals to record images on a recording medium such as a recording sheet. The ink-jet printer is configured so as to introduce ink into an actuator of a recording head and eject, onto the recording sheet, the ink pressurized by utilizing deflection or flexure of piezoelectric elements, electrostrictive elements, and so on or by utilizing local or partial boiling of the ink by heat-generating elements, based on input signals.

In the ink-jet printer, when the recording sheet is fed onto a sheet-discharge tray from a sheet-supply tray, an image recording operation is performed in which the ink is selectively ejected onto the recording sheet from the recording head. A sheet-supply operation in which the recording sheet is supplied from the sheet-supply tray to a sheet-feed path, and a sheet-feed operation in which the recording sheet is fed in the sheet-feed path are performed by rotations of rollers referred to as a sheet-supply roller and a sheet-feed roller in a state in which the rollers are pressed on the recording sheet. As the drive source of the rollers each as one of driven portions, a motor such as a DC motor or a stepping motor is used. Drive power is transmitted from the motor to the rollers by a drive-power transmitting system including a pinion gear, a timing belt, and so on.

In the image recording operation, air bubbles may be generated in nozzles of the recording head through which the ink is ejected, or the nozzles may be plugged or clogged with foreign matters, whereby an ink ejection failure may occur. As a technique for restoring or preventing the ink ejection failure, there has been known what is called a purging operation that is a technique for removing, by sucking, the air bubbles and the foreign matters from the nozzles of the recording head. A maintenance unit for performing the purging operation includes a cap for covering the nozzles of recording head, a pump for reducing a pressure in the cap, and so on. The motor is also used as a drive source for driving the pump, as one of the driven portions, of the maintenance unit and a cam, as another of the driven portions, for switching a state of an air-discharge valve. The drive power is transmitted from the motor to a selected one or ones of the driven portions by a drive-power transmitting system like the drive-power transmitting system described above.

There is conventionally known an image recording apparatus including a switching mechanism for switching driven portions to which the drive power of the motor as the drive source is transmitted. This switching mechanism selectively transmits the drive power to a selected one or ones of the driven portions depending upon a position of the carriage, as disclosed in Japanese Patent Application Publication No. 2007-90761 (Patent Document 1). Thus, the drive power can be transmitted from one drive source to the sheet-feed roller and so on when the image recording operation is performed, or to the maintenance unit when the purging operation is performed, for example.

According to Patent Document 1, drive power of one LF motor (42) is selectively transmitted to one or ones of a plurality of driven portions by the switching mechanism (100). This switching mechanism (100) includes a switching gear (102) and four types of transmission gears, namely, a transmission gear (113) for intermittently supplying recording sheets, a transmission gear (114) for successively supplying the recording sheets, a transmission gear (121) for supplying the recording sheets accommodated in a lower cassette, and a transmission gear (115) for maintenance of the recording head. A lever (104*a*) is positioned at one of a first, a second, and a third guide position (111, 112, 108), whereby the switching gear (102) is meshed with a selected one of the transmission gears that corresponds to the one of the guide positions at which the lever is positioned, so as to transmit the drive power to the one of the transmission gears. A position of the lever (104*a*) is switched depending upon a position of a carriage (13) which is moved in a main scanning direction in correspondence with respective modes of operations of the image recording apparatus. It is noted that respective reference numerals within parentheses are reference numerals that are used in Patent Document 1.

SUMMARY OF THE INVENTION

It is not so complicated to control the switching mechanism (100) in which the switching gear (102) is meshed with a selected one of the transmission gears (113, 114, 121, 115) in order to transmit the drive power of the LF motor (42) to a selected or desired one or ones of the driven portions in correspondence with the respective modes of the operations of the image recording apparatus as disclosed in Patent Document 1. However, image recording apparatuses are considered to become more multifunctional, and thus a number of modes of operations of each of the image recording apparatuses is considered to be accordingly increased. For example, in order to make it possible to record images on both sides of each of the recording sheets, there arises a need to switch paths for recording a front and a back side of each recording sheet. Further, in a two-sided recording, in order to eliminate a problem such as cockling of the recording sheet which is caused by ink absorbed in the recording sheet, a feeding of the recording sheets may be stopped for ink-drying time in which the ink on the recording sheet is dried. In the ink-drying time, it is desirable that a carriage is operated for capping nozzles of a recording head in order to prevent the ink in the recording head from drying.

Considering an adapting to the increased number of the modes and a driving of one or ones of the driven portions in the two-sided recording or the like with another one or ones of the driven portions being stopped, a system in which a switching gear is selectively meshed with one of a plurality of transmission gears in correspondence with the modes of the operations of the image recording apparatus becomes more complicated in controlling, e.g., releasing of a pressure between surfaces of the switching gear and one of the transmission gears which is being meshed with the switching gear, and matching of rotational phases (i.e., rotational angles) of the switching gear and one of the transmission gears which is to be meshed with the switching gear, when a gear with which the switching gear is meshed is switched from one to another of the transmission gears. Further, there is a risk of requiring more time for switching the meshes of the switching gear and the transmission gears. In order to solve these problems, it can be considered an image recording apparatus in which a plurality of motors each as a drive source are provided and which has a structure in which a plurality of transmission gears are disposed in correspondence with the plurality of motors.

If two switching gears are provided for two motors, two levers each having the same structure as the above-described lever (104*a*) need to be disposed in correspondence with the two switching gears for determining and changing respective positions of the two switching gears. In this case, since a carriage (13) changes respective positions of the two levers (104*a*), a first step portion (13*a*) and a second step portion (13*n*) which are engageable with the respective levers (104*a*) need to be provided at two portions of the carriage (13). Thus, the carriage (13) is upsized, so that the image recording apparatus is accordingly upsized, unfortunately. Further, since an enough force for moving the two levers (104*a*) against first forcing springs (106) each of which applies an elastic force to a corresponding one of the two levers (104*a*) needs to be applied to the carriage (13), a load received by a CR motor (24) becomes larger. As a result, the CR motor (24) needs to be upsized, so that there is a risk of upsizing of the apparatus and increasing of power consumption.

This invention has been developed in view of the above-described situations, and it is an object of the present invention to provide an image recording apparatus configured to transmit drive power of a plurality of drive sources to a plurality of driven portions and including a mechanism configured to transmit the drive power to a selected one or ones of the driven portions, without upsizing of the apparatus or increasing of a load received by a carriage.

It is another object of the present invention to provide an image recording apparatus including a drive-power transmitting system which permits a supplying and a feeding of recording sheets, and a maintenance of a recording head to be performed independently of each other.

The objects indicated above may be achieved according to the present invention which provides an image recording apparatus comprising: a carriage which carries a recording head mounted on the carriage and which is reciprocable in a predetermined direction across an image recording area in which the recording head performs an image recording operation on a recording medium and a maintenance area in which a maintenance of the recording head is performed; a plurality of driven portions; a first drive source and a second drive source which generate drive power for driving the plurality of the driven portions; and a drive-power transmitting system configured to transmit the drive power of the first and the second drive source to the plurality of the driven portions, wherein the drive-power transmitting system includes: a shaft having an axis extending in an axial direction parallel to the predetermined direction; a first switching gear and a second switching gear supported by the shaft so as to be rotatable about the axis of the shaft and slidable in the axial direction, and respectively driven to be rotated by the drive power of the first drive source and by the drive power of the second drive source; a first transmission gear disposed so as to be meshed with the first switching gear in accordance with a position of the first switching gear in the axial direction, and configured to transmit, by being meshed with the first switching gear, the drive power of the first drive source, to a first driven portion as one of the plurality of the driven portions which is driven in relation to the maintenance of the recording head; a second transmission gear disposed so as to be meshed with the second switching gear in accordance with a position of the second switching gear in the axial direction, and configured to transmit, by being meshed with the second switching gear, the drive power of the second drive source, to a second driven portion as one of the plurality of the driven portions which is different from the first driven portion and which is driven in relation to the maintenance of the recording head; a third transmission gear disposed so as to be meshed with the second switching gear in accordance with the position of the second switching gear in the axial direction, and configured to transmit, by being meshed with the second switching gear, the drive power of the second drive source, to a third driven portion as one of the plurality of the driven portions which is different from the first and the second driven portion and which is driven in relation to a feeding of the recording medium in the image recording operation performed by the recording head; and a switching-gear positioning mechanism configured to slide the first and the second switching gear together with each other in the axial direction depending upon a position of the carriage, wherein when the carriage is positioned in the maintenance area, the switching-gear positioning mechanism positions a set of the first and the second switching gear at a first specific position as a position at which the first switching gear is meshed with only the first transmission gear while the second switching gear is meshed with only the second transmission gear, and wherein when the carriage is positioned in the image recording area, the switching-gear positioning mechanism positions the set of the first and the second switching gear at a second specific position as a position at which the first switching gear is not meshed with any of the first transmission gear, the second transmission gear, and the third transmission gear while the second switching gear is meshed with only the third transmission gear.

In the image recording apparatus constructed as described above, a load received by the carriage when the first switching gear and the second switching gear are moved from one to another of the plurality of the specific positions can be reduced. Consequently, a smaller-sized CR motor can be employed as a drive source for reciprocating the carriage, to reduce power consumption.

Further, in the image recording apparatus constructed as described above, when the set of the first switching gear and the second switching gear is positioned at the first specific position, the drive power is transmitted via the drive-power transmitting system for performing the maintenance of the recording head. When the set of the first switching gear and the second switching gear is positioned at the second specific position, the drive power is transmitted via the drive-power transmitting system for performing the feeding of the recording medium. Thus, the supplying and the feeding of recording medium, and the maintenance of the recording head can be performed independently of each other.

BRIEF DESCRIPTION OF THE DRAWINGS

The objects, features, advantages, and technical and industrial significance of the present invention will be better understood by reading the following detailed description of a preferred embodiment of the invention, when considered in connection with the accompanying drawings, in which.

DESCRIPTION OF THE PREFERRED EMBODIMENT

Figure 5:
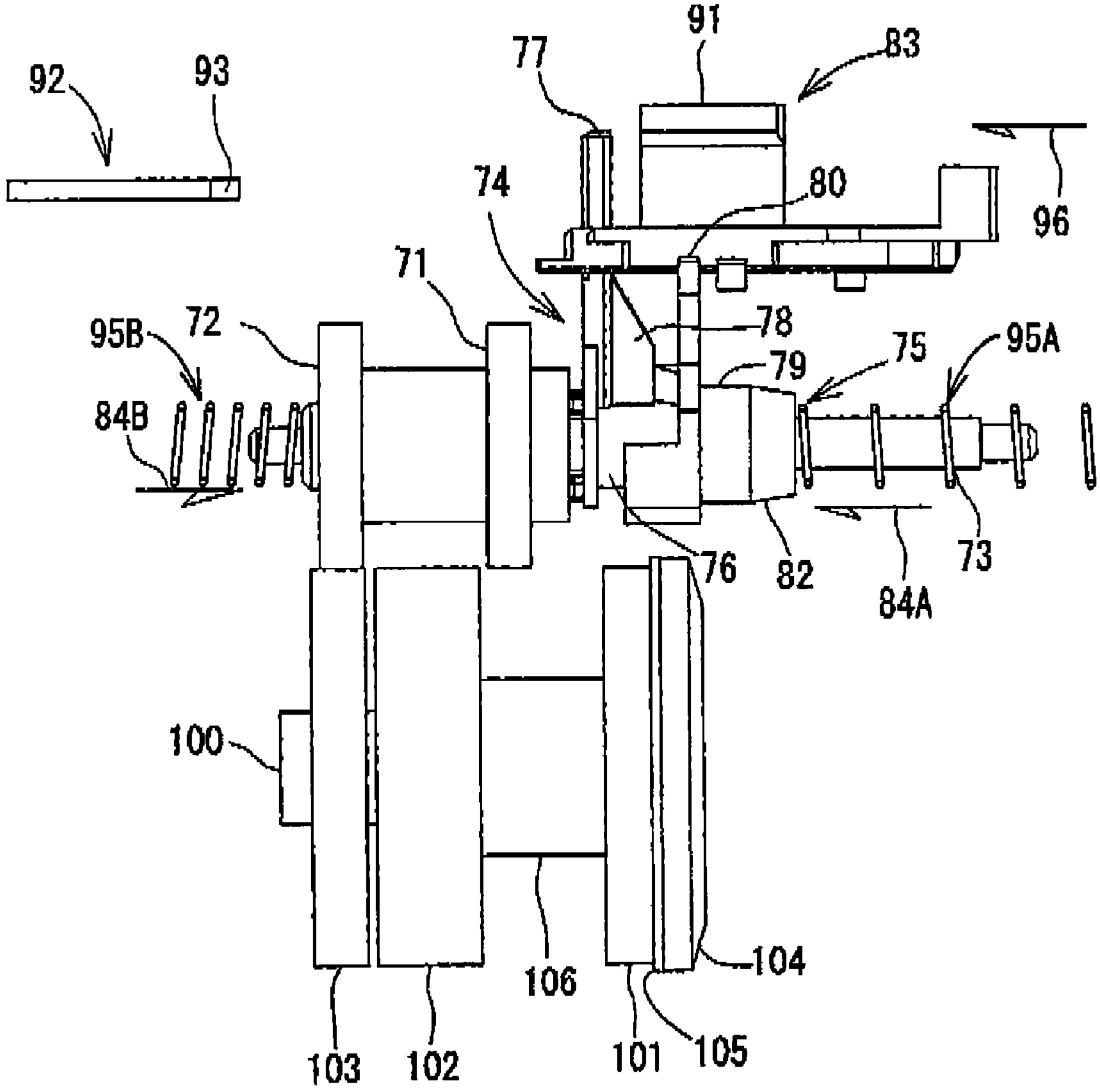
FIG. 5 is a front view showing a state of the switching mechanism 70 when a set of a first switching gear 71 and a second switching gear 72 of the switching mechanism 70 is positioned at a second specific position.
Figure 7:
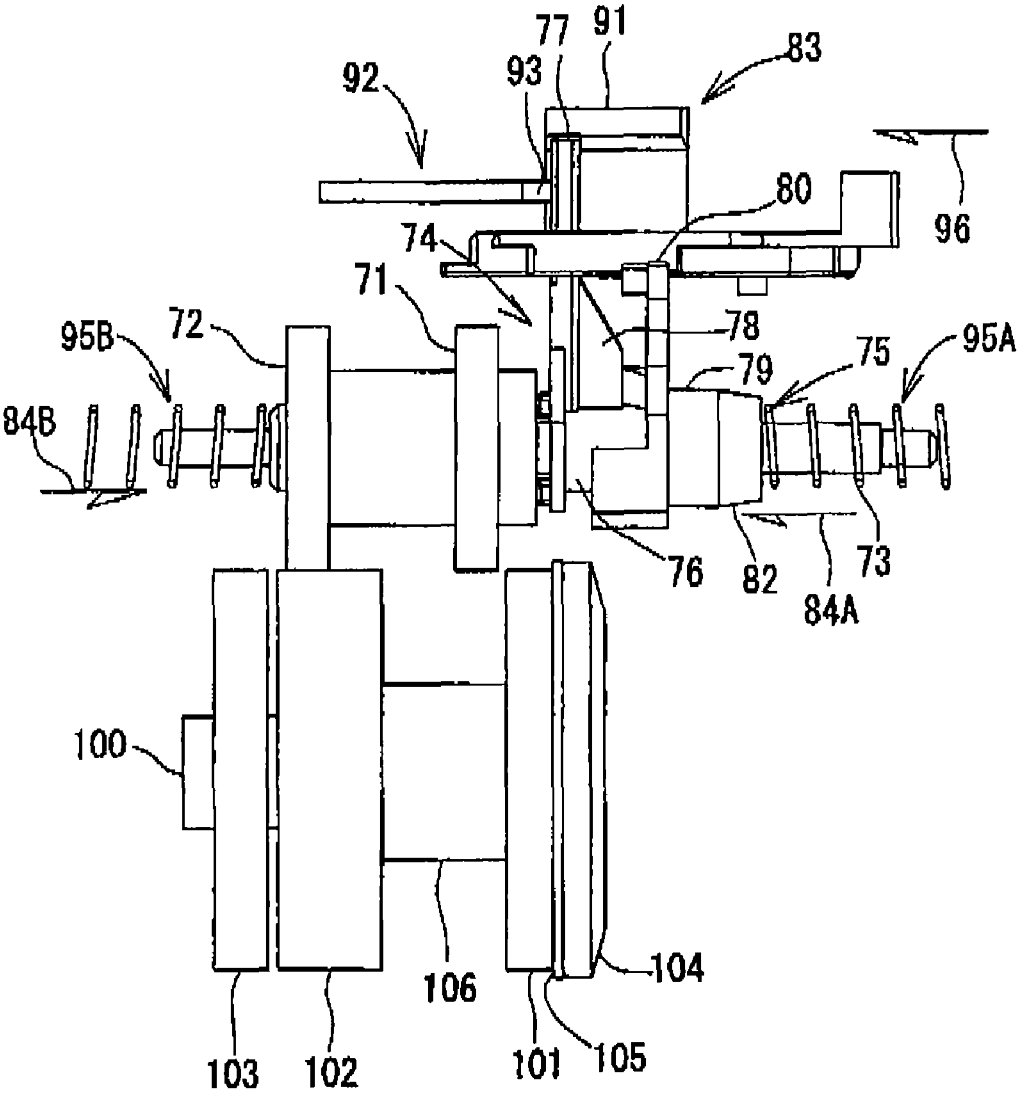
FIG. 7 is a front view showing a state of the switching mechanism 70 when the set of the first switching gear 71 and the second switching gear 72 is positioned at a third specific position.
Figure 8:
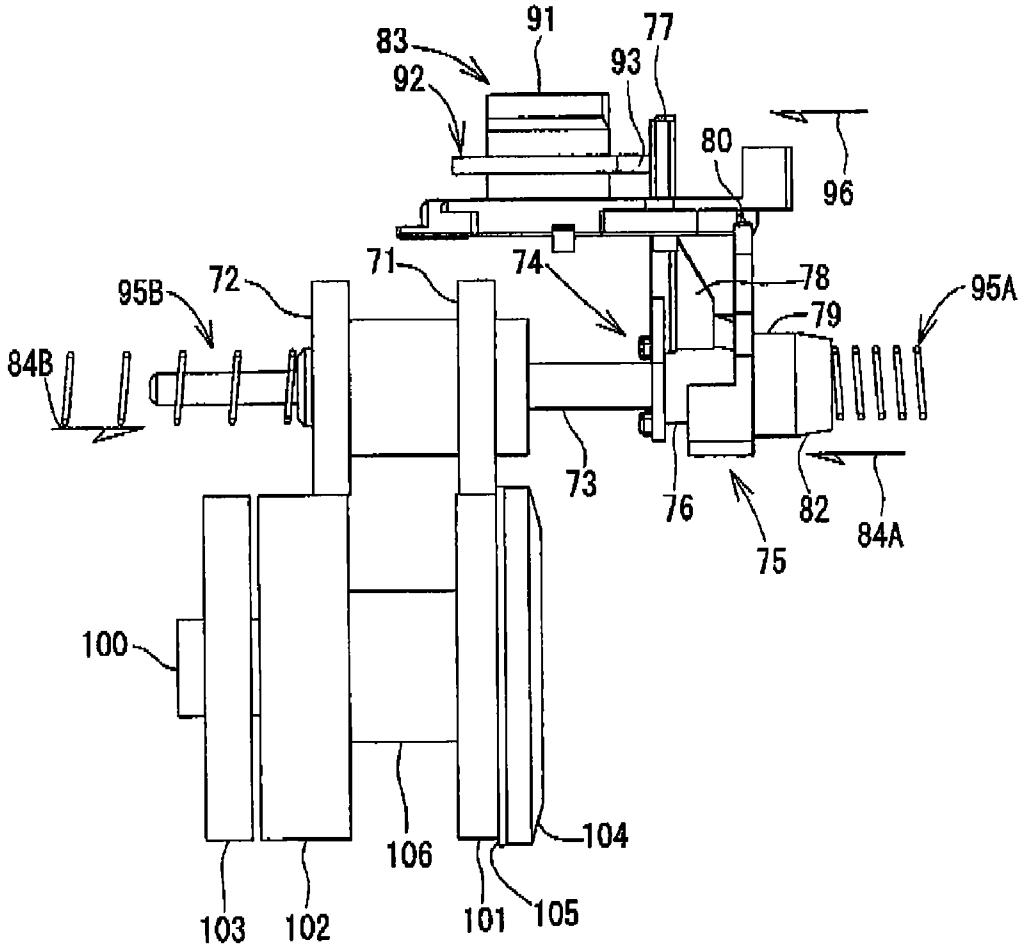
FIG. 8 is a front view showing a state of the switching mechanism 70 when the set of the first switching gear 71 and the second switching gear 72 is positioned at a first specific position.

Hereinafter, there will be described a preferred embodiment of the present invention by reference to the drawings. It is to be understood that the following embodiment is described only by way of example, and the invention may be otherwise embodied with various modifications without departing from the scope and spirit of the invention. It is noted that, in the drawings, each gear is provided by a spur gear unless otherwise noted, and teeth of each gear are omitted. In FIGS. 5, 7, and 8, a carriage 62, a recording head 61, ink tubes 59, a platen 63, a belt drive mechanism 46, a purging device 55, and so on are also omitted.

General Structure of MFD 10

Figure 1:
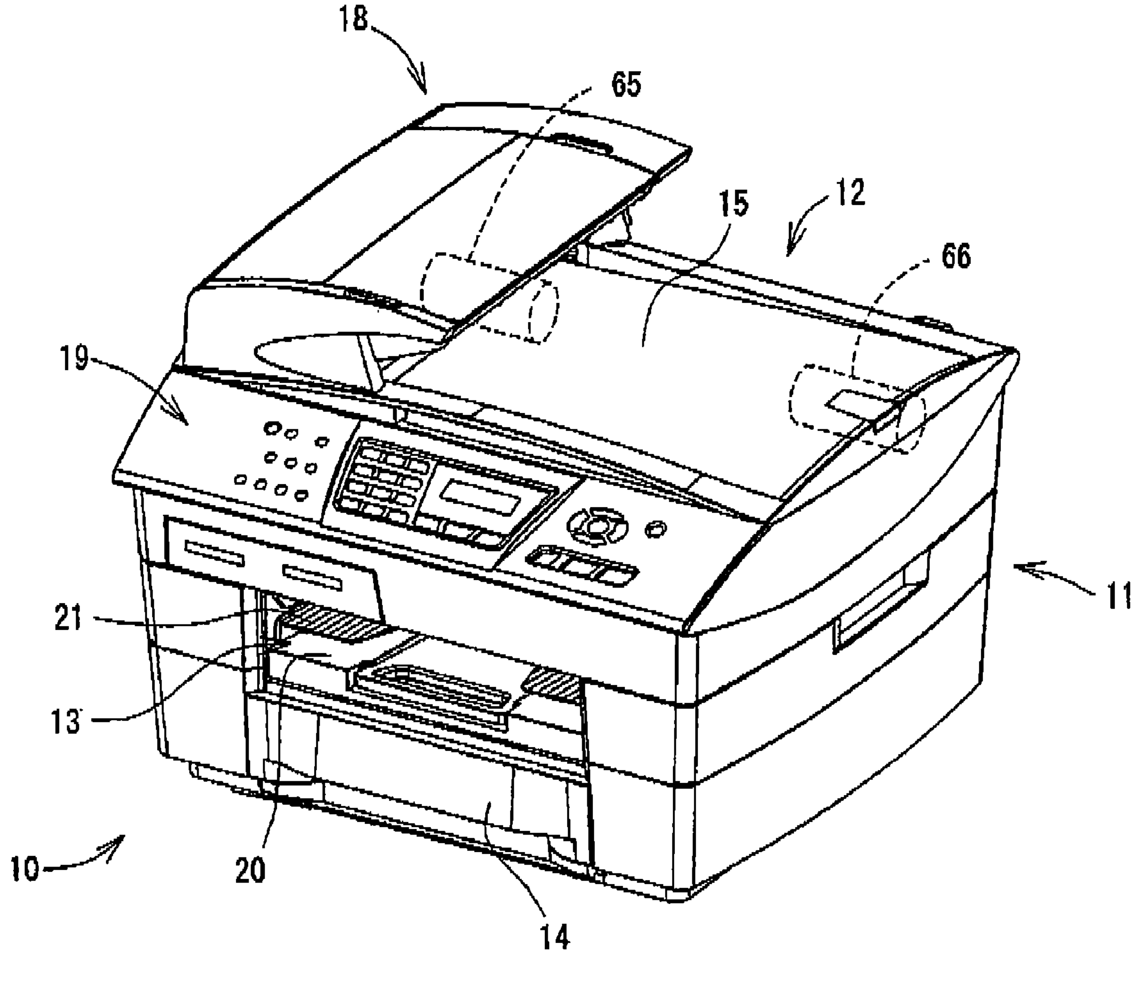
FIG. 1 is an external perspective view of an MFD 10 as an embodiment of the present invention.
Figure 2:
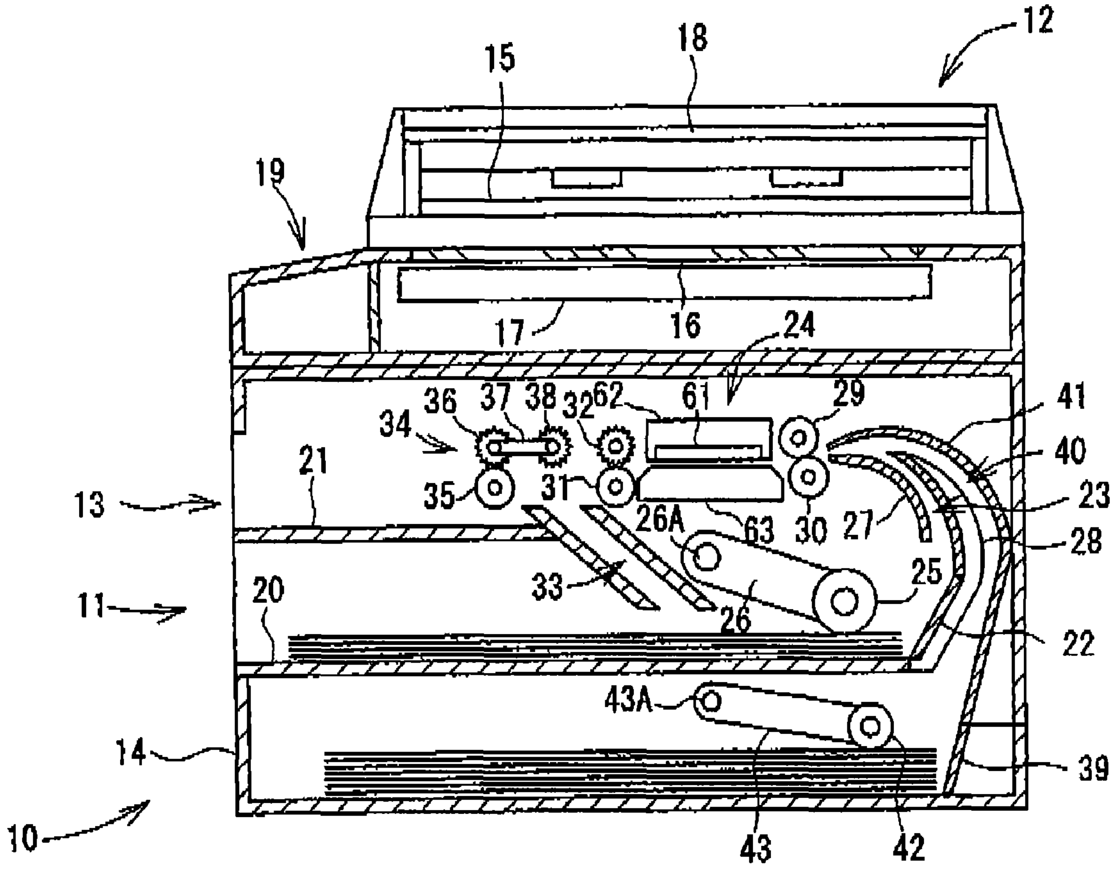
FIG. 2 is an elevational view in vertical cross section generally showing an internal structure of the MFD 10.

As shown in FIGS. 1 and 2, an MFD 10 is a multifunction device integrally including a printer section 11 at a lower portion thereof and a scanner section 12 at an upper portion thereof, and having a printer function, a scanner function, a copying function, and a facsimile function. In the MFD 10, the printer section 11 corresponds to an image recording apparatus to which the present invention is applied. Accordingly, the functions other than the printer function may be omitted, that is, the image recording apparatus may be configured, for example, as a single-function printer which does not have the scanner, copying, or facsimile functions.

The printer section 11 is configured to be mainly connected to an external information devices such as a computer to record images or characters on a recording medium on the basis of recording data including image data or document data which is transmitted from the external information devices. It is noted that one or ones of various storage media such as a memory card can be mounted in the MFD 10. The printer section 11 can record images or characters on the recording medium on the basis of image data or the like stored in the one or ones of storage media. As the recording medium, a paper sheet and a resin sheet may be employed, for example.

The MFD 10 has a generally rectangular parallelepiped shape, and an opening 13 is formed in a front face of the MFD 10. In the opening 13, there are provided a sheet-supply tray 20 and a sheet-discharge tray 21 which are superposed on each other in a vertical direction. The sheet-supply tray 20 is configured to accommodate recording sheets, each as the recording medium, of various standard sizes such as an A4 size, a B5 size, and a postcard size which are smaller than a legal size, for example. Each recording sheet accommodated in the sheet-supply tray 20 is supplied to an inside of the printer section 11. The printer section 11 records desired images on the supplied recording sheet. Then, the recording sheet is discharged onto the sheet-discharge tray 21.

On a lower side of the opening 13, a sheet-supply cassette 14 is provided, The sheet-supply cassette 14 can accommodate the recording sheets of the legal size, the A4 size, and the B5 size, for example. The sheet-supply cassette 14 can accommodate several times to about ten times as many recording sheets as the sheet-supply tray 20 can accommodate. Thus, the sheet-supply cassette 14 accommodates a large number of the recording sheets having a relatively high frequency of use such as the A4 size.

The scanner section 12 functions as what is called a flatbed scanner (FBS). As shown in FIGS. 1 and 2, a document cover 15 is provided on an upper surface of the MFD 10 so as to be opened and closed. When the document cover 15 is opened, a platen glass 16 is exposed. Below the platen glass 16, an image sensor 17 is provided. The image sensor 17 reads images on the recording sheet placed on the platen glass 16 while moving. The document cover 15 is provided with an auto document feeder (ADF) 18. It is noted that the present invention can be carried out without particular limitations on construction of the scanner 3, and a detailed explanation is despensed with.

On a top front portion of the MFD 10, an operation panel 19 is provided. The operation panel 19 includes a plurality of operation buttons and a liquid crystal display portion. The plurality of the operation buttons include a power button, a start button, a stop button, mode buttons, ten keys, and the like, for example. The power button is for turning a power on and off, the start button is for starting an image reading operation, the stop button is for stopping various operations, the mode buttons are for setting one of modes such as a copying mode, a scanning mode, and a facsimile mode, and the ten keys are for inputting facsimile numbers and for performing various settings for, e.g., conditions of the image reading operation and the image recording operation. The MFD 10 is operated on the basis of operation commands from the operation panel 19. Where the MFD 10 is connected to a computer as the external device, the MFD 10 is operated also on the basis of commands transmitted from the computer via a printer driver or a scanner driver.

Printer Section 11

As shown in FIG. 2, on a rear side of the sheet-supply tray 20, an inclined sheet-separate plate 22 is provided. The inclined sheet-separate plate 22 separates each of the recording sheets supplied from the sheet-supply tray 20, from the other recording sheets, so as to guide upward an uppermost one of the recording sheets. Above the sheet-supply tray 20, there is provided a first sheet-supply roller 25, as one of third driven portions, for supplying each recording sheet accommodated in the sheet-supply tray 20 toward the inclined sheet-separate plate 22. The first sheet-supply roller 25 is supported by a shaft at a free end of a first arm 26. The first sheet-supply roller 25 is rotated by drive power which is transmitted from an auto sheet feed motor (ASF motor) 66 shown in FIG. 1 to the first sheet-supply roller 25 via a drive-power transmitting system which has a plurality of gears meshed with each other and which will be described in detail. It is noted that a feeding of the recording sheets includes a supplying of the recording sheets from the sheet-supply tray 20 and the sheet-supply cassette 14, and a feeding of the recording sheets in a first sheet-feed path 23 and a second sheet-feed path 33. The third driven portions perform the supplying of the recording sheets from the sheet-supply tray 20 and the sheet-supply cassette 14. In this respect, the ASF motor 66, as a second drive source, which generates drive power for driving the first sheet-supply roller 25 is a DC motor.

The first arm 26 is pivotably supported by a support shaft 26A so as to be moved upward and downward such that the first arm 26 can contact the sheet-supply tray 20. The first arm 26 is forced so as to pivot downward by a self-weight thereof or by a force of a spring or the like. Thus, the first arm 26 normally contacts the sheet-supply tray 20, and when the sheet-supply tray 20 is inserted into or pulled out of the MFD 10, the first arm 26 is retracted to an upper position thereof. The first sheet-supply roller 25 is brought into pressing contact with the uppermost recording sheet in the sheet-supply tray 20 since the first arm 26 is forced so as to pivot downward. In this state, the first sheet-supply roller 25 is rotated, whereby the uppermost recording sheet is fed toward the inclined sheet-separate plate 22 owing to a friction force between a roller surface of the first sheet-supply roller 25 and the recording sheet.

The first sheet-feed path 23 initially extends upward from the inclined sheet-separate plate 22, then turns toward a front side of the MFD 10. Further, the sheet-feed path 23 extends from a rear side toward the front side of the MFD 10 while passing through an image recording unit 24 and finally reaching the sheet-discharge tray 21. Accordingly, each recording sheet accommodated in the sheet-supply tray 20 is fed to the image recording unit 24 while being guided through the sheet-feed path 23 so as to make an upward U-turn. After the recording sheet is subjected to the image recording operation by the image recording unit 24, the recording sheet is discharged onto the sheet-discharge tray 21.

The first sheet-feed path 23 is defined by a pair of guide surfaces facing to each other with a predetermined distance interposed therebetween, except a portion thereof where the image recording unit 24 is disposed. For instance, a portion of the first sheet-feed path 23 in the rear side of the MFD 10 is defined by a first guide member 27 and a second guide member 28 which are fixed to a frame of the MFD 10. Guide rollers may be provided at a curved portion of the first sheet-feed path 23 particularly where the sheet-feed path 23 is curved, so as to be rotated in a widthwise direction of the first sheet-feed path 23, in a state in which roller surfaces of the guide rollers are exposed at an outer one of the guide surfaces. The guide rollers assure a smooth feeding of each recording sheet contacting the outer guide surface at the curved portion of the first sheet-feed path 283

The image recording unit 24 is provided on a downstream side of the curved portion of the first sheet-feed path 23 in a direction in which each recording sheet is fed (hereinafter may be referred to as a sheet feeding direction), The image recording unit 24 includes the carriage 62 which carries the recording head 61 mounted thereon and which is reciprocable in a predetermined direction. The recording head 61 is of an ink-jet type in which the recording head 61 performs the image recording operation by ejecting the ink through nozzles of the recording head 61. To the recording head 61, cyan ink (C), magenta ink (M), yellow ink (Y), and black ink (Bk) are supplied via the respective ink tubes 59 (shown in FIG. 3) from respective ink cartridges disposed in the MFD 10 independently of the recording head 61. During the reciprocation of the carriage 62, the recording head 61 ejects ink of the different colors as fine droplets through the nozzles to record images on the recording sheet being fed on the platen 63. It is noted that a detailed structure of the image recording unit 24 will be described below.

A sheet-feed roller 29 and a pinch roller 30 are provided as a pair on an upstream side of the image recording unit 24 in the sheet feeding direction. Each recording sheet fed in the first sheet-feed path 23 is nipped by the sheet-feed roller 29 and the pinch roller 30, and fed onto the platen 63. Drive power generated or outputted by a line feed motor (an LF motor) 65, as a first drive source, shown in FIG. 1 is transmitted to the sheet-feed roller 29, whereby the sheet-feed roller 29 is, intermittently driven at a predetermined line feed pitch. The pinch roller 30 is provided so as to move toward and away from the sheet-feed roller 29. The pinch roller 30 is elastically forced by a coil spring so as to be pressed to the sheet-feed roller 29. When each recording sheet is fed into between the sheet-feed roller 29 and the pinch roller 30, the pinch roller 30 is retracted against the elastic force by a distance corresponding to a thickness of the recording sheet. In this state, the recording sheet is held between the sheet-feed roller 29 and the pinch roller 30 such that the pinch roller 30 presses the recording sheet to the sheet-feed roller 29. Thus, a rotational force of the sheet-feed roller 29 is reliably transmitted to each recording sheet. It is noted that the LF motor 65 which generates the drive power for driving the sheet-feed roller 29 is a DC motor.

On a downstream side of the image recording unit 24, a sheet-discharge roller 31 and a spur 32 are provided as a pair. The sheet-discharge roller 31 and the spur 32 feed, to the sheet-discharge tray 21, each recording sheet on which images are recorded, while nipping the recorded recording sheet therebetween. The drive power generated by the LF motor 65 is transmitted to the sheet-feed roller 29 and the sheet-discharge roller 31, whereby the sheet-feed roller 29 and the sheet-discharge roller 31 are intermittently driven at the predetermined line feed pitch. The rotations of the sheet-feed roller 29 and the sheet-discharge roller 31 are synchronized with each other. A rotary encoder (not shown) provided on the sheet-feed roller 29 is configured to detect, via an optical sensor, a pattern of an encoder disc which rotates with the sheet-feed roller 29. On the basis of thus detected detection signals, the rotation of the LF motor 65 is controlled. It is noted that the rotary encoder is omitted in FIG. 2.

The spur 32 is brought into pressing contact with each recorded recording sheet. A roller surface of the spur 32 has a plurality of projections and depressions like a spur so as not to deteriorate the images recorded on the recording sheet. The spur 32 is provided so as to be movable toward and away from the sheet-discharge roller 31. The spur 32 is elastically forced by a coil spring so as to be brought into pressing contact with the sheet-discharge roller 31. When each recording sheet is fed into between the sheet-discharge roller 31 and the spur 32, the spur 32 is retracted against a force of the coil spring by a distance corresponding to a thickness of the recording sheet. In this state, each recording sheet is held between the sheet-discharge roller 31 and the spur 32 such that the spur 32 presses each recording sheet to the sheet-discharge roller 31. Thus, a rotational force of the sheet-discharge roller 31 is reliably transmitted to each recording sheet.

As shown in FIG. 2, the second sheet-feed path 33 is formed so as to connect a portion of the first sheet-feed path 23 which is located downstream of the image recording unit 24 and a portion of the sheet-supply tray 20 which is located upstream of the first sheet-supply roller 25. The second sheet-feed path 33 downwardly inclines from the portion located downstream of the image recording unit 24 toward the first sheet-supply roller 25. The second sheet-feed path 33 guides, onto the sheet-supply tray 20, each recording sheet which has been subjected to the image recording operation on one side thereof by the image recording unit 24. Like the first sheet-feed path 23, the second sheet-feed path 33 is defined by a pair of guide surfaces facing to each other with a predetermined distance interposed therebetween.

As shown in FIG. 2, in a portion of the first sheet-feed path 23 which is located downstream of the image recording unit 24, a path-switching portion 34 is provided in correspondence with the second sheet-feed path 33. The path-switching portion 34 supplies each recording sheet fed through the first sheet-feed path 23, to a selected one of the sheet-discharge tray 21 and the second sheet-feed path 33. The path-switching portion 34 includes a switch back roller 35, a spur 36, a frame 37, and a spur 38.

The switch back roller 35 and the spur 36 are provided on a downstream side of a portion of the first sheet-feed path 23, at which the first sheet-feed path 23 and the second sheet-feed path 33 are connected to each other. When a one-sided recording is performed on each recording sheet, the image recording unit 24 records the images on one side of the recording sheet fed through the first sheet-feed path 23, and then the recorded recording sheet is discharged onto the sheet-discharge tray 21 by the switch back roller 35 and the spur 36. When a two-sided recording is performed, the image recording unit 24 records the images on one side of the recording sheet fed through the first sheet-feed path 23, and then the recorded recording sheet is fed toward the second sheet-feed path 33 by the switch back roller 35 and the spur 36, that is, a switch back feeding is performed. In other words, the switch back roller 35 is driven to switch from one to another of paths through which the recording sheets are to be fed upon the image recording operation performed by the recording head 61.

In the switch back feeding, the frame 37 is pivoted by a pivoting mechanism toward the second sheet-feed path 33 to lower the spur 38. Then, the recording sheet is guided by the spur 38 toward the second sheet-feed path 33 and fed onto the sheet-supply tray 20. When a leading end of the recording sheet reaches the first sheet-supply roller 25, the recording sheet is again fed by the first sheet-supply roller 25 to the image recording unit 24 via the first sheet-feed path 23 such that the other side of the recording sheet which is not subjected to the image recording operation is to be opposed to the recording head 61. After the other side of the recording sheet has been subjected to the image recording operation, the recording sheet is discharged to the sheet-discharge tray 21 by the path-switching portion 34.

The switch back roller 35 of the path-switching portion 34 is rotated by the drive power outputted from the LF motor 65 and is synchronized with the sheet-feed roller 29. The frame 37 of the path-switching portion 34 is rotated by the drive power outputted from the ASP motor 66 as the second power source. That is, each of the switch back roller 35 and the pivoting mechanism functions as one of the driven portions of this MFD 10. More specifically, the pivoting mechanism functions as a fourth driven portion, and each of the sheet-feed roller 29, the sheet-discharge roller 31, and the switch back roller 35 functions as one of fifth driven portions of this MFD 10. As described above, the feeding of the recording sheets includes the supplying of the recording sheets from the sheet-supply tray 20 and the sheet-supply cassette 14, and the feeding of the recording sheets in a first sheet-feed path 23 and a second sheet-feed path 33. The fifth driven portions perform the feeding of the recording sheets in the first sheet-feed path 23 and the second sheet-feed path 33.

As shown in FIG. 2, the sheet-supply cassette 14 is mounted on a lower side of the sheet-supply tray 20. The sheet-supply cassette 14 has a rectangular parallelepiped box-like shape with an opening formed on an upper face thereof. The sheet-supply cassette 14 is configured to accommodate a plurality of the recording sheets in a state in which the recording sheets are stacked on each other. On a rear side of the sheet-supply cassette 14, an inclined sheet-separate plate 39 is provided. If a plurality of sheets are fed to the inclined sheet-separate plate 39 at the same time, the inclined sheet-separate plate 39 separates an uppermost one of the recording sheets from the other of the sheets while guiding the uppermost recording sheet upward.

A third sheet-feed path 40 is formed to extend upward from the inclined sheet-separate plate 39. The third sheet-feed path 40 initially extends upward from the inclined sheet-separate plate 39, and then turns toward the front side of the MFD 10. Finally, the third sheet-feed path 40 communicates with the first sheet-feed path 23 at a position located upstream of the sheet-feed roller 29 in the sheet feeding direction. The third sheet-feed path 40 is defined by, as an inner guide surface thereof, a back surface of the second guide member 28 which functions as the outer guide surface of the first sheet-feed path 23, and, as an outer guide surface thereof, a third guide member 41 provided on an outer side of the inner guide surface of the third sheet-feed path 40 with a predetermined distance therebetween. The recording sheet accommodated in the sheet-supply cassette 14 is fed to the image recording unit 24 while being guided through the third sheet-feed path 40 so as to make an upward U-turn and then fed into the first sheet-feed path 23. After the recording sheet has been subjected to the image recording operation by the image recording unit 24, the recording sheet is discharged onto the sheet-discharge tray 21.

Above the sheet-supply cassette 14, there is provided a second sheet-supply roller 42, as one of the third driven portions, for supplying each recording sheet accommodated in the sheet-supply cassette 14 toward the third sheet-feed path 40. The second sheet-supply roller 42 is supported by a shaft at a free end of a second arm 43. The second sheet-supply roller 42 rotates by drive power which is transmitted from the ASF motor 66 to the second sheet-supply roller 42 via the drive-power transmitting system which has the plurality of gears meshed with each other and which will be described in detail.

The second arm 43 is pivotably supported by a support shaft 43A so as to be moved upward and downward such that the second arm 43 can contact the sheet-supply cassette 14. The second arm 43 is forced so as to pivot downward by a self-weight thereof or by a force of a spring, or the like. Thus, the second arm 43 normally contacts the sheet-supply cassette 14, and when the sheet-supply cassette 14 is inserted into or pulled out of the MFD 10, the second arm 43 is retracted to an upper position thereof. The second sheet-supply roller 42 is brought into pressing contact with the uppermost recording sheet in the sheet-supply cassette 14 since the second arm 43 is forced so as to pivot downward. In this state, the second sheet-supply roller 42 is rotated, whereby the uppermost recording sheet is fed toward the inclined sheet-separate plate 39 owing to a friction force between a roller surface of the second sheet-supply roller 42 and the recording sheet. The recording sheet is brought into contact with the inclined sheet-separate plate 39 and guided upward. Then, the recording sheet is fed to the third sheet-feed path 40.

Image Recording Unit 24

Figure 3:
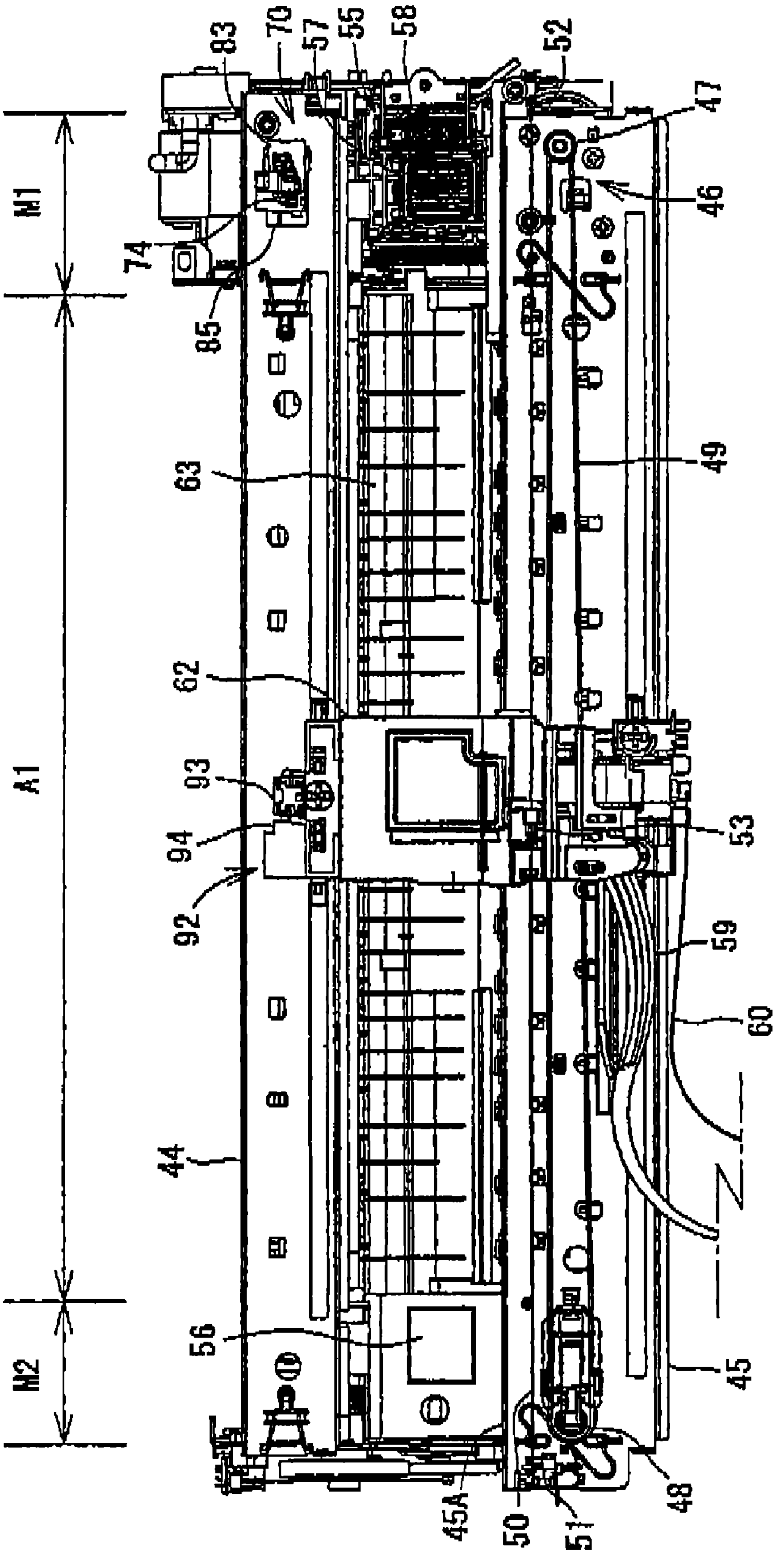
FIG. 3 is a plan view showing a main structure of a printer section 11.

As shown in FIG. 3, above the first sheet-feed path 23, a pair of guide rails 44, 45 are disposed. The guide rails 44, 45 are opposed to each other with a specific distance interposed therebetween in the sheet feeding direction (i.e., a direction extending from an upper side toward a lower side of the sheet of FIG. 3). The guide rails 44, 45 extend in a direction perpendicular to the sheet feeding direction, that is, the guide rails 44, 45 extend in a right and left direction in FIG. 3. The guide rails 44, 45 are provided in a casing of the printer section 11 and partly constitutes a frame for supporting components constituting the printer section 11. The carriage 62 bridges between the guide rails 44, 45 and is slidable on the guide rails 44, 45 in the direction perpendicular to the sheet feeding direction.

The guide rail 44 is provided on an upstream side of the guide rail 45 in the sheet feeding direction and has a planar plate shape having a length longer than a range in which the carriage 62 reciprocates, in a widthwise direction of the first sheet-feed path 23 (i.e., in the right and left direction in FIG. 3). The guide rail 45 has a planar plate shape having a length substantially the same as that of the guide rail 44 in the widthwise direction of the first sheet-feed path 23. The carriage 62 is slidable in a longitudinal direction of the guide rails 44, 45 in a state in which an upstream end portion of the carriage 62 in the sheet feeding direction is on the guide rail 44 while a downstream end portion of the carriage 62 in the sheet feeding direction is on the guide rail 45. An upstream edge portion 45A of the guide rail 45 in the sheet feeding direction is bent upward in a direction substantially perpendicular to the guide rail 45. The carriage 62 on the guide rails 44, 45 slidably nips the edge portion 45A by nipping members of the carriage 62 such as a pair of rollers. Thus, the carriage 62 is positioned with respect to the sheet feeding direction and permitted to slide in the predetermined direction, i.e., the direction perpendicular to the sheet feeding direction.

A belt driving mechanism 46 is disposed on an upper surface of the guide rail 45. The belt driving mechanism 46 includes a drive pulley 47, a driven pulley 48, and an endless, annular belt 49 having teeth on an inner side thereof. The drive pulley 47 and the driven pulley 48 are disposed near respective opposite ends of the sheet-feed path 23 in a widthwise direction thereof. The belt 49 is tensioned between the drive pulley 47 and the driven pulley 48. The drive pulley 47 is driven by a CR motor (not shown). The timing belt 49 is circulated by the rotation of the drive pulley 47. It is noted that the belt 49 does not have to be necessarily provided by the endless, annular belt, and may be provided by a non-endless belt that is connected at its opposite end portions to the carriage 62.

The carriage 62 is fixed at a bottom surface thereof to the belt 49. Thus, the carriage 62 reciprocates on the guide rails 44, 45 along the edge portion 45A on the basis of the circulation of the timing belt 49. The recording head 61 is mounted on the carriage 62 as mensioned above, so that the recording head 61 reciprocates in a widthwise direction of the sheet-feed path 23 as a main scanning direction.

An encoder strip 50 of a linear encoder (not shown) is disposed on the guide rail 44. The encoder strip 50 has a shape like a band and is formed of a transparent resin. A pair of support portions 51, 52 are respectively formed on opposite end portions of the guide rail 44 in a widthwise direction thereof (that is, in the predetermined direction in which the carriage 62 reciprocates) such that the support portions 51, 52 are erected from an upper surface of the guide rail 44. Opposite end portions of the encoder strip 50 are respectively engaged with the support portions 51, 52, so that the encoder strip 50 is provided along the edge portion 45A while being held by the support portions 51, 52.

The encoder strip 50 includes light transmitting portions each of which transmits light, and light intercepting portions each of which intercepts light. The light transmitting portions and the light intercepting portions are alternately arranged at certain pitches in a longitudinal direction of the encoder strip 50 so as to form a predetermined pattern. An optical sensor 53 of a transmission type is provided on an upper surface of the carriage 62 at a position corresponding to the encoder strip 50. The optical sensor 53 reciprocates with the carriage 62 in the longitudinal direction of the encoder strip 50. During the reciprocation, the optical sensor 53 detects the pattern of the encoder strip 50. The recording head 61 includes a head control substrate for controlling an ink ejecting operation of the recording head 61. The head control substrate outputs pulse signals based on detection signals from the optical sensor 53. On the basis of the pulse signals, a position of the carriage 62 is recognized and the drive and the rotation of the CR motor are controlled. It is noted that since the head control substrate is covered with a head cover of the carriage 62, the head control substrate is not shown in FIG. 3.

As shown in FIGS. 2 and 3, the platen 63 is provided below the first sheet-feed path 23 so as to be opposed to the recording head 61. The platen 63 extends over a central portion of a range of the reciprocation of the carriage 62. Each recording sheet passes through the central portion. A width of the platen 63 is sufficiently greater than the greatest one of respective widths of various types of feedable recording sheets. Thus, widthwise opposite ends of the recording sheet fed through the first sheet-feed path 23 always pass over the platen 63. In this MFD 10, the range of the reciprocation of the carriage is corresponded to an image recording area A1 in which the recording head 61 performs the image recording operation on each recording sheet.

As shown in FIG. 3, the purging device 55 is disposed at one of opposite areas located outside of the platen 63 in a widthwise direction thereof. A waste ink tray 56 is disposed at the other of the opposite areas. The purging device 55 and the waste ink tray 56 are for performing a maintenance of the recording head 61. An area in which the purging device 55 is disposed is a first maintenance area M1. An area in which the waste ink tray 56 is disposed is a second maintenance area M2. The first maintenance area M1 and the second maintenance area M2 are adjacent to respective opposite ends of the image recording area A1. The carriage 62 can reciprocate across the image recording area A1, the first maintenance area M1, and the second maintenance area M2.

The purging device 55 is for removing, by sucking, air bubbles and foreign matters from nozzles of the recording head 61. The purging device 55 includes a nozzle cap 57 for covering the nozzles of the recording head 61 when the carriage 62 is positioned in the maintenance are M1, and an air-discharge cap 58 for covering air-discharge openings of the recording head 61. The nozzle cap 57 and the air-discharge cap 58 are raised and lowered by a well-known cap-lifting-up mechanism so as to move toward and away from the recording head 61. The purging device 55 further includes a sucking pump, not shown in FIG. 3. The sucking pump is connected to the nozzle cap 57 and the air-discharge cap 58. When the sucking pump is operated, negative pressure is applied to an inside of each of the nozzle cap 57 and the air-discharge cap 58. Thus, when the sucking pump is operated in a state in which the nozzle cap 57 and the air-discharge cap 58 contact the recording head 61 and respectively cover the nozzles and the air-discharge openings, the air bubbles and foreign matters are removed, by sucking, from the recording head 61. The sucking pump of the purging device 55 is operated by the drive power transmitted from the LF motor 65 as the first drive source. The cap-lifting-up mechanism of the purging device 55 is operated by the drive power transmitted from the ASF motor 66 as the second drive source. That is, the sucking pump of the purging device 55 functions as a first driven portion, and the cap-lifting-up mechanism functions as a second driven portion.

The waste ink tray 56 is for receiving the ink ejected from the recording head 61 in what is called a flushing. Felts as ink absorbers are laid in the waste ink tray 56, and the ink ejected in the flushing is absorbed and held in the felts. Maintenances such as prevention of drying in the recording head 61 and removal of the air bubbles and/or mixed ink from the recording head 61 are thus performed using the purging device 55 and the waste in tray 56.

Not shown in the figures, the printer section 11 is provided with a cartridge mounting portion on which the ink cartridges storing ink of different colors of each other are mounted. The ink tubes 59 respectively corresponding to the ink of different colors are routed from the cartridge mounting portion to the carriage 62. The ink of different colors is supplied from the corresponding ink cartridges mounted on the cartridge mounting portion to the recording head 61 mounted on the carriage 62 via the corresponding ink tubes 59. The ink tubes 59 are formed of synthetic resin and have a flexibility so as to be flexed according to the reciprocation of the carriage 62.

Recording signals and the like are transmitted to the head control substrate of the recording head 61 from a main substrate constituting a control section, not shown, via a flat cable 60. It is noted that the main substrate is disposed on a front portion of the MFD 10, and thus not illustrated in FIG. 3. The flat cable 60 is a belt-like member including conductors which transmit electric signals and which are covered by a synthetic resin film, such as a polyester film, so as to be insulated. The main substrate and the head control substrate are electrically connected to each other by the flat cable 60. The flat cable 60 has a flexibility so as to be flexed according to the reciprocation of the carriage 62.

Switching Mechanism 70

There will be next explained the switching mechanism 70 which partly constituting the drive-power transmitting system. The switching mechanism 70 is for selectively transmitting the drive power of the two motors (i.e., the LF motor 65 and the ASF motor 66), to the plurality of the driven portions such as the first sheet-supply roller 25, the sucking pump of the purging device 55, the cap-lifting-up mechanism of the purging device 55, and the second sheet-supply roller 42. More specifically, the switching mechanism 70 is disposed on a right portion (in FIG. 3) of the frame including the guide rails 44, 46 and so on. The switching mechanism 70 transmits, to a selected one or ones of the driven portions, the drive power of the two sources. Strictly speaking, the switching mechanism 70 transmits, to the selected one or ones of the driven portions, respective drive powers of the LF motor 65 and the ASF motor 66 independently of each other.

The drive power of the LF motor 65 is inputted to one end (a left end in FIG. 3) of the sheet-feed roller 29. On the other end (a right end in FIG. 3) of the sheet-feed roller 29, a first drive gear (not shown) is provided so as to rotate integrally with the sheet-feed roller 29 about an axis about which the same 29 rotates. A first switching gear 71 is meshed with the first drive gear, so as to be driven to be rotated on the basis of the drive power of the LF motor 65 as the first drive source. A thickness of the first drive gear is sufficiently large with respect to a range of slide of the first switching gear 71. Thus, in the slide range of the first switching gear 71, the first switching gear 71 and the first drive gear are always meshed with each other. An axis of the first switching gear 71 is parallel to that of the first drive gear, so that the first switching gear 71 is movable in a direction parallel to the axis of the first drive gear. The thickness of the first drive gear in an axial direction thereof corresponds to a range of the movement of the first switching gear 71. Thus, in the range of the movement of the first switching gear 71, the first drive gear and the first switching gear 71 are held to be meshed with each other.

The ASF motor 66 as the second drive source is disposed near the switching mechanism 70. The drive power of the ASF motor 66 is transmitted from an output shaft thereof to a second switching gear 72 via a second drive gear (not shown), whereby the second switching gear 72 is driven to be rotated. A thickness of the second drive gear is sufficiently large with respect to a range of slide of the second switching gear 72. Thus, in the slide range of the second switching gear 72, the second switching gear 72 and the second drive gear are always meshed with each other. An axis of the second switching gear 72 is parallel to that of the second drive gear, so that the second switching gear 72 is movable in a direction parallel to the axis of the second drive gear. The thickness of the second drive gear in an axial direction thereof corresponds to a range of the movement of the second switching gear 72. Thus, in the range of the movement of the second switching gear 72, the second drive gear and the second switching gear 72 are held to be meshed with each other.

As shown in FIG. 5, the first switching gear 71 and the second switching gear 72 are supported by a support shaft 73 so as to be rotatable about an axis of the shaft 73 and slidable in an axial direction thereof. The first switching gear 71 is disposed on a right side of the second switching gear 72 in FIG. 5. The support shaft 73 is horizontally supported by the frame. The axis of the support shaft 73 extends in the axial direction parallel to the predetermined direction in which the carriage 62 is reciprocated. In other words, the vial direction of the support shaft 73 (i.e., a right and left direction in FIG. 5) is parallel to the predetermined direction in which the carriage 62 is reciprocated. The first switching gear 71 and the second switching gear 72 are slid on the support shaft 73, whereby the first switching gear 71 and the second switching gear 72 are selectively meshed with a first transmission gear 101, a second transmission gear 102, and a third transmission gear 103 described below.

At an outside of the first switching gear 71 in the predetermined direction (more specifically, at a right side of the first switching gear 71 in FIG. 5), an input lever 74, as a lever member, and an engaging member 75 are provided on the support shaft 73 so as to be slidable thereon in the axial direction. It is noted that the input lever 74, the engaging member 75, and a lever guide 88, coil springs 95A, 95B, and so on which are described below constitute a switching-gear positioning mechanism configured to slide the first switching gear 71 and the second switching gear 72 together with each other in the axial direction depending upon the position of the carriage 62.

Figure 6:
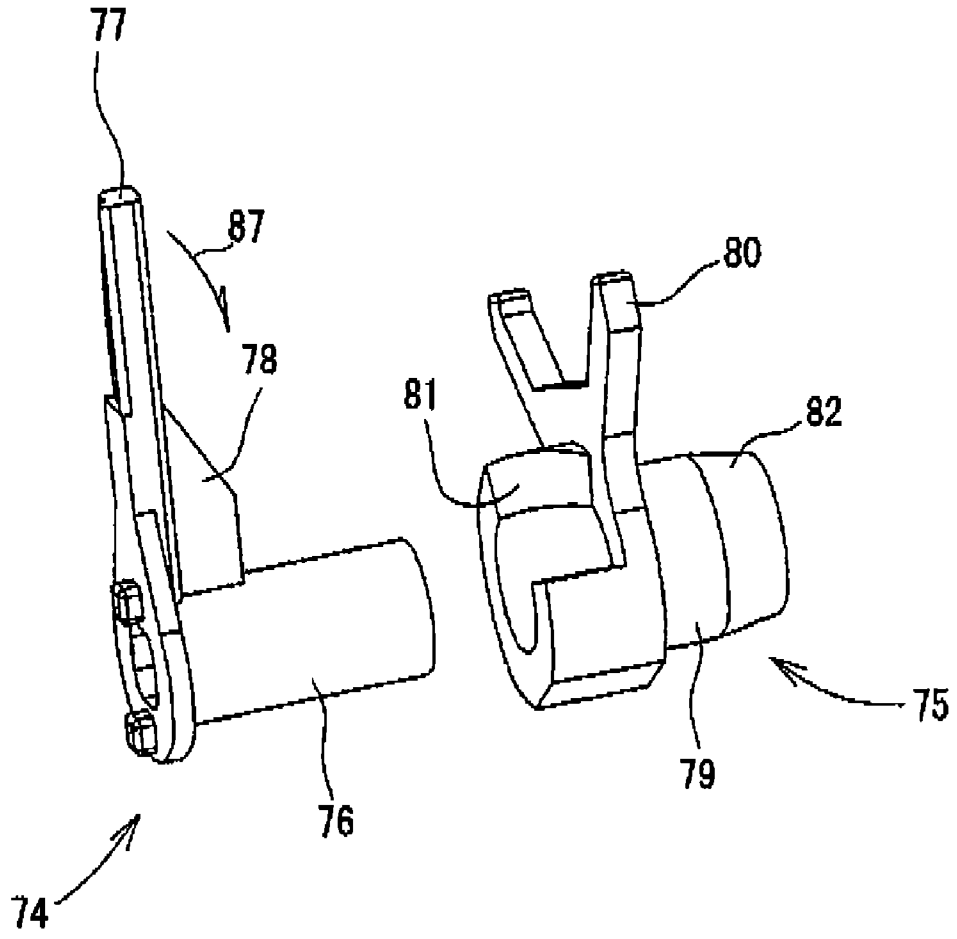
FIG. 6 is an exploded perspective view showing respective structures of an input lever 74 and an engaging member 75 of the switching mechanism 70.

As shown in FIG. 6, the input lever 74 includes a cylindrical boss 76 fitted on the support shaft 73, and a lever arm 77 provided so as to project from the cylindrical boss 76 in a radial direction thereof. The cylindrical boss 76 fitted on the support shaft 73 is rotatable and slidable in the axial direction of the support shaft 73. That is, the lever arm 77 can be slid in the axial direction of the support shaft 73 and can be rotated about the support shaft 73. A rib 78 is provided near a basal end of the lever arm 77 so as to extend in an axial direction of the cylindrical boss 76.

The engaging member 75 includes a cylindrical boss 79 fitted on the cylindrical boss 76 of the input lever 74, and a slide guide 80 which projects from the cylindrical boss 79 in a radial direction thereof so as to form a Y-shape. The cylindrical boss 79 fitted on the cylindrical boss 76 of the input lever 74 is rotatable about the cylindrical boss 76 and slidable in the axial direction of the support shaft 73. One end portion of the cylindrical boss 79 which is nearer to the input lever 74 has a guide surface 81 being adjacent to a cutout of the cylindrical boss 79 and extending from an end face of the one end portion toward the other end portion 82 in a spiral manner.

The guide surface 81 corresponds to two projected portions of the slide guide 80 in a peripheral direction of the support shaft 73. The end portion 82 of the cylindrical boss 79 has a tapered shape in which an inner diameter of the end portion 82 is smaller than an outer diameter of the cylindrical boss 76 of the input lever 74. This limits a position at which the cylindrical boss 79 is fitted on the cylindrical boss 76.

The slide guide 80 has the Y-shape so as to interpose the lever guide 83 as seen in the axial direction of the support shaft 73. The slide guide 80 is brought into contact with the lever guide 83, thereby limiting a rotation of the engaging member 75 relative to the cylindrical boss 76 of the input lever 74. Thus, the engaging member 75 is slid in the axial direction while maintaining a specific rotational posture of the engaging member 75 with respect to the cylindrical boss 76 of the input lever 74.

The guide surface 81 of the engaging member 75 is brought into contact with the rib 78 of the input lever 74. As not shown in the figures, the engaging member 75 is forced toward the input lever 74 (in a direction indicated by arrow 84A in FIG. 5) by the coil spring 95A as a forcing member which is extendable and contractable in the axial direction of the support shaft 73. In other words, the coil spring 95A forces the input lever 74 in one of opposite directions parallel to the axial direction. The second switching gear 72 is forced toward the input lever 74 (in a direction indicated by arrow 84B) by the coil spring 95B as another forcing member which is extendable and contrastable in the axial direction of the support shaft 73. The first switching gear 71 is also forced toward the input lever 74 by the coil spring 95B, with the second switching gear 72 interposed between the first switching gear 71 and the coil spring 95B. In other words, the coil spring 95B presses the first switching gear 71 and the second switching gear 72 toward the input lever 74 by forcing the first switching gear 71 and the second switching gear 72 in the other of the opposite directions. That is, the second switching gear 72 and the engaging member 75 are forced, with the first switching gear 71 and the input lever 74 interposed therebetween, by the two coil springs 95A, 95B in the directions in which the second switching gear 72 and the engaging member 75 move closer to each other. Thus, the second switching gear 72, the first switching gear 71, the input lever 74, and the engaging member 75 function as a unit on the support shaft 73. A force of the coil spring 95A which forces the engaging member 75 (in the direction indicated by the arrow 84A) is larger than that of the coil spring 95B which forces the second switching gear 72 (in the direction indicated by the arrow 84B). Thus, the second switching gear 72, the first switching gear 71, the input lever 74, and the engaging member 75 are slid on the support shaft 73 together with each other in the direction indicated by the arrow 84A as long as no external force is applied. It is noted that the first switching gear 71 and the second switching gear 72 can rotate independently of each other in a state in which the first switching gear 71 and the second switching gear 72 can move together with each other.

Figure 4:
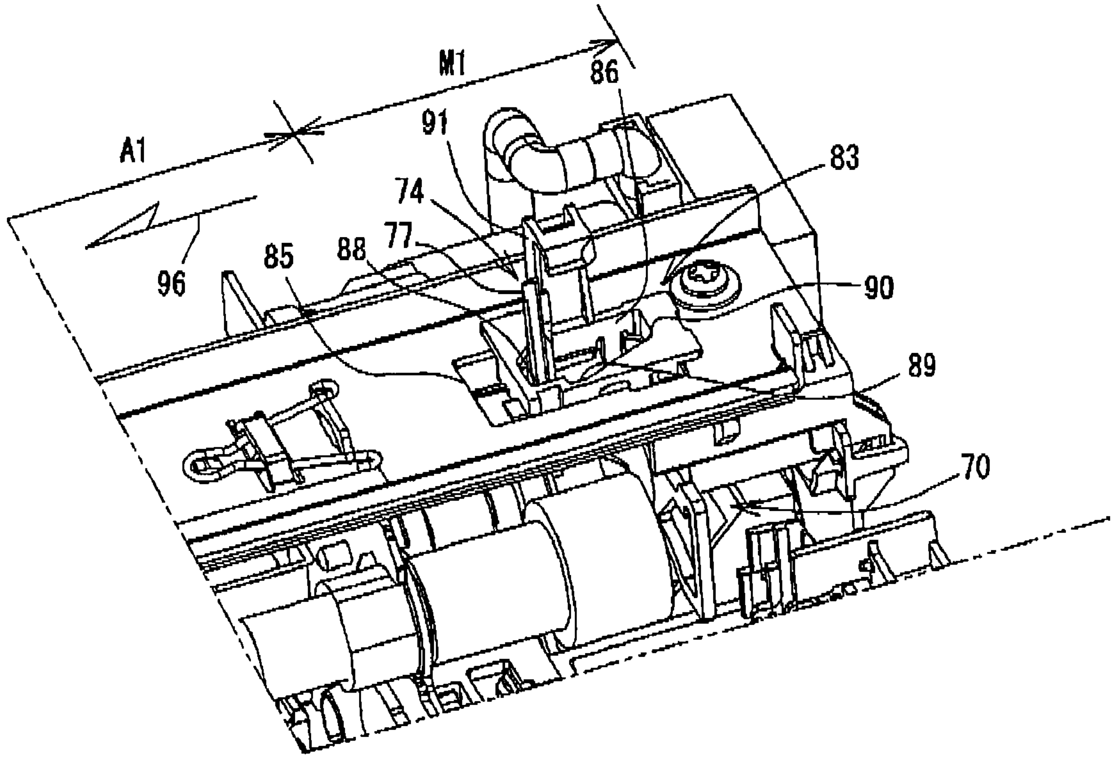
FIG. 4 is a partial perspective view showing a structure of a portion of the MED 10 which includes a switching mechanism 70.

As shown in FIGS. 4 and 5, the lever guide 83 is provided above the support shaft 73. The lever guide 83 is fixed to the guide rail 44 by being fitted in a hole 85 (shown in FIG. 4) formed in a portion of the guide rail 44 which is nearer to the purging device 55. The lever guide 83 is a generally planar plate member in which a guide hole 86 having a specific shape is formed. The lever arm 77 of the input lever 74 is inserted through the guide hole 86 to project upward from the guide rail 44. As described above, the engaging member 75 maintains its specific rotational posture with respect to the cylindrical boss 76 of the input lever 74. In the specific rotational posture, the guide surface 81 is located at the same rotational position as the slide guide 80. When the rib 78 of the input lever 74 receives the force of the coil spring 85B by contacting the guide surface 81, the rib 78 is guided along the guide surface 81 in a direction indicated by arrow 87 (shown in FIG. 6). Thus, as shown in FIG. 4, as long as no external force is applied, the lever arm 77 inserted through the guide hole 86 is kept to be located at a first guide position 88 that is a front left corner portion of the guide hole 86, in other words, a corner portion of the guide hole 86 which is located at a downstream portion thereof in the sheet feeding direction and located nearer to a central portion of the MFD 10 in a plane perpendicular to the vertical direction. This first guide position 88 corresponds to a second specific position of a set of the first switching gear 71 and the second switching gear 72.

As shown in FIG. 4, on a downstream edge of the guide hole 86 in the sheet feeding direction, a second guide position 89 and a third guide position 90 are provided in order from the first guide position 88 toward the right side of the MFD 10. The second guide position 89 is located at a recessed portion of the downstream edge which is adjacent to a recessed cutout formed on a right side of the first guide position 88 and a downstream side of the first guide position 88 in the sheet feeding direction. At the second guide position 89, the lever arm 77 can be stopped by the recessed cutout so as not to move in the direction indicated by the arrow 84A, that is, in the direction in which the input lever 74 is elastically forced. The second guide position 89 and the third guide position 90 are connected to each other by an inclined surface formed so as to diagonally extend from the second guide position 89 to the third guide position 90 which is located on a right side of the second guide position 89 and an upstream side of the second guide position 89 in the sheet feeding direction. The lever arm 77 can be smoothly moved from the second guide position 89 to the third guide position 90 by being guided by the inclined surface. The second guide position 89 corresponds to a third specific position of the set of the first switching gear 71 and the second switching gear 72 while the third guide position 90 corresponds to a first specific position of the set of the first switching gear 71 and the second switching gear 72.

On an upstream edge of the guide hole 86 in the sheet feeding direction, a return guide 91 is provided. The return guide 91 has a shape like an inverted hook. That is, the return guide 91 projects upward in the vertical direction from the edge of the guide hole 86, horizontally extends downstream in the sheet feeding direction to a central portion of the guide hole 86, and extends downward in the vertical direction from an horizontally extended end of the return guide 91 such that the horizontally extended end is located below an upper end of the lever arm 77. The return guide 91 guides the lever arm 77 along a path through which the lever arm 77 passes when returning from the third guide position 90 to the first guide position 88.

As shown in FIGS. 3 and 5, on an upstream end of the carriage 62 in the sheet feeding direction, there is provided a guide piece 92 horizontally projecting toward an upstream side thereof in the sheet feeding direction. The guide piece 92 is reciprocated with the carriage 62. One of opposite end portions of the guide piece 92 which contacts the lever arm 77 (a right end portion in FIGS. 3 and 5) includes, at a basal end portion thereof nearer to the carriage 62, an inclined surface 93 and, at a distal end portion thereof, a cutout 94. The inclined surface 93 can be brought into contact with the lever arm 77 when the lever arm 77 is located at the first guide position 88 or the second guide position 89. The inclined surface 93 is inclined leftward in FIG. 3 with being downstream in the sheet feeding direction. When the carriage 62 is moved from the image recording area A1 to the maintenance area M1, a state in which the carriage 62 contacts the lever arm 77 is established. More specifically, the guide piece 92 is moved with the carriage 62 in the axial direction of the support shaft 73, whereby the inclined surface 93 is brought into contact with the lever arm 77 located at the first guide position 88 or the second guide position 89. Thus, the lever arm 77 is pressed and slid to the second guide position 89 or the third guide position 90 while being pressed downstream in the sheet feeding direction by the inclined surface 93.

The cutout 94 of the guide piece 92 is engaged with the lever arm 77 when the lever arm 77 is located at the third guide position 90. When the lever arm 77 is moved from the second guide position 89 to the third guide position 90, the lever arm 77 is pivoted in a direction opposite to the direction indicated by the arrow 87, thereby being engaged with the cutout 94 of the guide piece 92 at the third guide position 90. The lever arm 77 is forced by the coil spring 95A in the direction indicated by the arrow 84A, and forced by the guide surface 81 of the engaging member 75 in the direction indicated by the arrow 87. These forces maintain the engagement of the lever arm 77 with the cutout 94.

When the guide piece 92 is moved with the carriage 62 in a direction indicated by arrow 96, the lever arm 77 engaged with the cutout 94 is moved in the direction indicated by the arrow 96 with the guide piece 92 by the force in the direction indicated by the arrow 84A. In this movement, the lever arm 77 is guided by the return guide 91 to move along an upstream edge of the guide hole 86 in the sheet feeding direction to a corner portion of the guide hole 86 which is located upstream of the first guide position 88 in the sheet feeding direction, so that the lever arm 77 is brought into contact with an edge portion of the corner portion, thereby being disengaged from the cutout 94. Then, the lever arm 77 is forced by the guide surface 81 of the engaging member 75 to be rotated in the direction indicated by the arrow 87, thereby being positioned at the first guide position 88. The input lever 74 is thus selectively moved to one of the first, second, and third guide positions 88, 89, 90 by a control for the reciprocation of the carriage 62. Further, the set of the first switching gear 71 and the second switching gear 72 is correspondingly and selectively moved to and positioned at one of the second, third, and first specific positions which are arranged in order in the axial direction. In other words, the switching-gear positioning mechanism is configured to position the set of the first switching gear 71 and the second switching gear 72 at a selected one of the first, second, and third specific positions relative to the transmission gears 101, 102, 103, for establishing transmission of the drive power to a selected one or ones of the driven portions which varies or vary depending upon the selected one of the first, second, and third specific positions.

As shown in FIGS. 3 and 4, the input lever 74 is disposed at a position in the first maintenance area M1, which position is slightly offset rightward from a boundary between the image recording area A1 and the first maintenance area M1. Even if the input lever 74 is disposed at a position in the image recording area A1, which position is slightly offset leftward from the boundary between the image recording area A1 and the first maintenance area M1, effects of the present invention are exhibited. However, if a load is changed by contacting of the carriage 62 with the lever arm 77 in the image recording area A1, there is a risk in which deterioration of recording quality is caused. Thus, the input lever 74 is preferably disposed at the position in the first maintenance area M1, which position is slightly offset rightward from the boundary between the image recording area A1 and the first maintenance area M1.

As shown in FIG. 5, under the first switching gear 71 and the second switching gear 72, the first transmission gear 101, the second transmission gear 102, and the third transmission gear 103 which are parallel to each other are arranged along and supported by a support shaft 100 as another shaft so as to be rotatable about an axis of the support shaft 100. The support shaft 100 is parallel to the support shaft 73. The first transmission gear 101 is disposed so as to be meshed, at a peripheral surface thereof, with and disengaged from the first switching gear 71 in accordance with a position of the first switching gear 71 in the axial direction. The second transmission gear 102 is disposed so as to be meshed, at a peripheral surface thereof, with and disengaged from the second switching gear 72 in accordance with a position of the second switching gear 72 in the axial direction. The third transmission gear 103 is disposed so as to be meshed, at a peripheral surface thereof, with and disengaged from the second switching gear 72 in accordance with the position of the second switching gear 72 in the axial direction. Even where the set of the first switching gear 71 and the second switching gear 72 is positioned at any of the specific positions, the second transmission gear 102 and the third transmission gear 103 are not meshed with the second switching gear 72 at the same time. The first transmission gear 101, the second transmission gear 102, and the third transmission gear 103 are different from each other in thickness and in presence or absence of a bevel gear 104, but are the same in outer diameter. The first transmission gear 101, the second transmission gear 102, and the third transmission gear 103 are arranged on the support shaft 100 in order from the maintenance are M1 toward the image recording area A1 (that is, from a right side toward a left side in FIG. 5). Between the first transmission gear 101 and the second transmission gear 102, there is provided a spacer 106 having a thickness corresponding to that of the second transmission gear 102, so that the first transmission gear 101 and the second transmission gear 102 are distant from each other. In these arrangements, the first transmission gear 101 is meshable with only the first switching gear 71 while the second transmission gear 102 and the third transmission gear 103 are mashable with only the second switching gear 72.

Each of the first transmission gear 101 and the third transmission gear 103 has a thickness equal to or slightly larger than that of each of the first switching gear 71 and the second switching gear 72. It is noted that, in this MFD 10, the first switching gear 71 and the second switching gear 72 have almost the same thickness, and the thickness is a thickness in which each of the first switching gear 71 and the second switching gear 72 is not meshed with two or more of the transmission gears 101, 102, 103 at the same time. Also, in the present embodiment, where the term "thickness of the gear" is simply used, the term "thickness" means a dimension in an axial direction thereof (i.e., a right and left direction in FIG. 5). On the other hand, the second transmission gear 102 has a thickness about twice as large as that of each of the first transmission gear 101 and the third transmission gear 103, and the thickness is a thickness in which the second transmission gear 102 is meshable with the second switching gear 72 if the set of the first switching gear 71 and the second switching gear 72 is positioned at any of two of the specific positions.

The bevel gear 104 is attached to the right side of the first transmission gear 101. The bevel gear 104 has an outer diameter larger than the first transmission gear 101 so as to provide a limiting surface 105 outwardly projecting from the first transmission gear 101 in a radial direction thereof between the bevel gear 104 and the first transmission gear 101. The first switching gear 71 is brought into contact with the limiting surface 105, thereby being limited from sliding and moving in the direction indicated by the arrow 84B from a position at which the first switching gear 71 is meshed with the first transmission gear 101. Thus, the first switching gear 71 and the first transmission gear 101 are held to be meshed with each other, and the input lever 74 and the engaging member 75 are separated from the first switching gear 71.

Each of the first transmission gear 101, the second transmission gear 102, and the third transmission gear 103 is for transmitting the drive power to a selected or a corresponding one or ones of the driven portions. More specifically, the first transmission gear 101 transmits the drive power of the LF motor 65 with the bevel gear 104 provided on the right side thereof to the sucking pump (the first driven portion) and so on in the purging device 55. The second transmission gear 102 selectively transmits, depending upon forward and reverse rotations thereof, the drive power of the ASF motor 66 to the pivoting mechanism (the fourth driven portion) of the path-switching portion 34 and the cap-lifting-up mechanism (the second driven portion) of the purging device 55. The third transmission gear 103 selectively, transmits, depending upon forward and reverse rotations thereof, the drive power of the ASF motor 66 to the first sheet-supply roller 25 and the second sheet-supply roller 42 (the third driven portions). The sucking pump of the purging device 55 and the cap-lifting-up mechanism are driven in relation to a maintenance of this MFD 10. It is noted that, in this MFD 10, a "the maintenance" of this MFD 10 does not always require the purging operation, and includes a capping operation in which the nozzles of the recording head 61 are capped. Further, "a feeding" performed by the MFD 10 includes a feeding of the recording sheets by the first sheet-supply roller 25 and the second sheet-supply roller 42 in addition to a feeding of the recording sheets by the sheet-feed roller 29, the sheet-discharge roller 31, and the switch back roller 35 upon the image recording operation.

As thus described, each of ones of the driven portions is assigned to a corresponding one of the first transmission gear 101, the second transmission gear 102, and the third transmission gear 103. As each of mechanisms for transmitting the drive power from a corresponding one of the first transmission gear 101, the second transmission gear 102, and the third transmission gear 103 to a corresponding one or ones of the driven portions, a well-known mechanism using gear trains, belts, or the like may be employed. However, this does not directly affect the scope and spirit of the present invention, and the detailed explanation thereof is dispensed with.

Operation of Switching Mechanism 70

Hereinafter, there will be explained, with reference to Table 1, an operation of the switching mechanism 70 in which are switched the meshes between the first switching gear 71 and the second switching gear 72, and the first transmission gear 101, the second transmission gear 102, and the third transmission gear 103

TABLE 1

Operation of the Switching Mechanism 70

| POSITION OF LEVER ARM 77 | FIRST GUIDE POSITION 88 | SECOND GUIDE POSITION 89 | THIRD GUIDE POSITION 90 |
|---|---|---|---|
| CORRESPONDING SPECIFIC POSITION | SECOND SPECIFIC POSITION | THIRD SPECIFIC POSITION | FIRST SPECIFIC POSITION |
| MESH OF FIRST SWITCHING GEAR | NOT MESHED | NOT MESHED | FIRST TRANSMISSION GEAR 101 |
| DRIVE POWER OF LF MOTOR 65 TRANSMITTED OBJECT | NOT TRANSMITTED | NOT TRANSMITTED | SUCKING PUMP OF PURGING DEVICE 55 |
| MESH OF SECOND SWITCHING GEAR | THIRD TRANSMISSION GEAR 103 | SECOND TRANSMISSION GEAR 102 | SECOND TRANSMISSION GEAR 102 |
| DRIVE POWER OF ASF MOTOR 66 TRANSMITTED OBJECT | FIRST SHEET-SUPPLY ROLLER 25/ SECOND SHEET-SUPPLY ROLLER 42 | CAP-LIFTING-UP MECHANISM/ PIVOTING MECHANISM | CAP-LIFTING-UP MECHANISM/ PIVOTING MECHANISM |

As shown in FIGS. 4 and 5 and Table 1, when the lever arm 77 inserted into the guide hole 86 is located at the first guide position 88, the set of the first switching gear 71 and the second switching gear 72 is located at the second specific position. At the second specific position, the first switching gear 71 is located at a portion of a space formed by the spacer 106 which is nearer to the second transmission gear 102. In this state, the drive power of the LF motor 65 as the first drive source is not transmitted from the first switching gear 71 to any of the driven portions. However, the first drive gear meshed with the first switching gear 71 can be rotated with the sheet-feed roller 29 by the drive power of the LF motor 65 as the first drive source, and the sheet-discharge roller 31 and the switch back roller 35 can be rotated so as to be synchronized with the sheet-feed roller 29. On the other hand, the second switching gear 72 is meshed with the third transmission gear 103. Thus, the drive power of the ASF motor 66 as the second drive source is transmitted to the first sheet-supply roller 25 or the second sheet-supply roller 42. The first switching gear 71 and the second switching gear 72 are respectively rotated by the two motors (i.e., the LF motor 65 and the ASF motor 66) independently of each other. Thus, at the second specific position, a sheet-supply operation from the sheet-supply tray 20 or the sheet-supply cassette 14 and a sheet-feed operation in the first sheet-feed path 23 can be controlled independently of each other. Consequently, one of the recording sheets can be supplied from the sheet-supply tray 20 or the sheet-supply cassette 14 while feeding another of the recording sheets, and the first sheet-supply roller 25 can be driven at suitable timing in the switch back feeding in the two-sided recording, for example. Further, the carriage 62 can be reciprocated in the image recording area A1 without contacting the input lever 74 when the set of the first switching gear 71 and the second switching gear 72 is positioned at the second specific position. It is noted that when the carriage 62 is moved from the maintenance area M1 to the image recording area A1, a state in which the carriage 62 does not contact the lever arm 77 is established. In the state in which the carriage 62 does not contact the lever arm 77, the set of the first switching gear 71 and the second switching gear 72 is positioned at the second specific position.

As shown in FIG. 7 and Table 1, when the guide piece 92 moves the lever arm 77 to the second guide position 89 (as shown in FIG. 4) by being brought into contact with the lever arm 77 with the movement of the carriage 62, the set of the first switching gear 71 and the second switching gear 72 is slid or moved to the third specific position by being forced by the elastic force of the coil spring 95B together with the lever arm 77 in the direction indicated by the arrow 84B against an elastic force of the coil spring 96A. At the third specific position which is located between the second specific position and the first specific position in the axial direction, the first switching gear 71 is located at a portion of the space formed by the spacer 106, which portion is nearer to the first transmission gear 101. In this state, the drive power of the LF motor 65 as the first drive source is not transmitted from the first switching gear 71 to any of the driven portions, However, like at the second specific position, the sheet-feed roller 29, the sheet-discharge roller 31, and the switch back roller 35 can be rotated by the drive power of the LF motor 65. That is, the drive power of the LF motor 65 is transmitted to the sheet-feed roller 29, the sheet-discharge roller 31, and the switch back roller 35 each as another driven portion which is driven in relation to the feeding of the recording medium, irrespective of whether the set of the first switching gear 71 and the second switching gear 72 is positioned at the first, the second, or the third specific position.

The second switching gear 72 is disengaged from the third transmission gear 103 and meshed with the second transmission gear 102 when the set of the first switching gear 71 and the second switching gear 72 is slid or moved from the second specific position to the third specific position. When the second switching gear 72 is disengaged from the third transmission gear 103 and meshed with the second transmission gear 102, a pressure between surfaces of the second switching gear 72 and the third transmission gear 103 is released by a control of the MFD 10 for slightly rotating the second drive gear in a reverse direction with respect to a direction in which the second drive gear has been rotated. Then, a slight forward and reverse rotations of the second switching gear 72 with respect to the second drive gear are alternately repeated in order to match rotational phases (i.e., rotational angles) of the second switching gear 72 and the second transmission gear 102. Thus, the rotational phases of the second switching gear 72 and the second transmission gear 102 are matched with each other, and the second switching gear 72 is slid or moved on the support shaft 73 by the elastic force of the coil spring 95B, so as to be disengaged from the third transmission gear 103 and meshed with the second transmission gear 102. The rotation of the first switching gear 71, and the forward and reverse rotations of the second switching gear 72 for releasing the pressure between the surfaces and for matching the rotational phases can be controlled independently of each other. That is, when the second switching gear 72 is forwardly and reversely rotated, the first switching gear 71 can be at rest and be rotated in one direction. Further, when the set of the first switching gear 71 and the second switching gear 72 is moved from the second specific position to the third specific position, the first switching gear 71 is not meshed with any of the first transmission gear 101, the second transmission gear 102, and the third transmission gear 103. Thus, a rotation of the first switching gear 71 does not need to be controlled for releasing a pressure between surfaces and for matching rotational phases.

The second transmission gear 102 transmits the drive power of the ASF motor 66 selectively to the cap-lifting-up mechanism of the purging device 55 and the pivoting mechanism of the path-switching portion 34. In other words, in a state in which the second transmission gear 102 and the second switching gear 72 are meshed with each other, the drive power of the ASF motor 66 is permitted to be transmitted to either of the second driven portion or the fifth driven portions (i.e., another driven portions). The first switching gear 71 and the second switching gear 72 are respectively rotated by the LP motor 65 and the ASF motor 66 independently of each other. Thus, at the third specific position, the path-switching operation of the path-switching portion 34 or the capping operation of the nozzle cap 57, and the sheet-feed operation in the first sheet-feed path 23 can be independently and easily controlled.

For example, in the two-sided recording, when the recording head 61 is to be capped while the feeding of the recording sheet is stopped in order to dry the ink, the carriage 62 is moved to a position just above the nozzle cap 57. In this operation, the guide piece 92 of the carriage 62 is brought into contact with the lever arm 77, whereby the lever arm 77 is moved to the third guide position 90, but, as will be described below, since the second switching gear 72 is held to be meshed with the second transmission gear 102, the nozzle cap 57 can be lifted up by the drive power of the ASF motor 66. The first switching gear 71 can be meshed with the first transmission gear 101 when the lever arm 77 is moved to the third guide position 90. Whether the first switching gear 71 can be meshed with the first transmission gear 101 or not depends upon whether rotational phases of the first switching gear 71 and the first transmission gear 101 are matched with each other or not when the feeding of the recording sheet is stopped. However, since the LF motor 65 is stopped while the feeding of the recording sheet is stopped, even if the first switching gear 71 is meshed with the first transmission gear 101 by being slid on the support shaft 73, the first switching gear 71 can be disengaged from the first transmission gear 101 by being slid on the support shaft 73, without releasing of pressure between surfaces of the first switching gear 71 and the first transmission gear 101, by the movement of the lever arm 77 to the first guide position 88 or the second guide position 89 after the mesh of the first switching gear 71.

The carriage 62 is moved to the image recording area A1 before the recording sheet is again fed after the completion of the drying of the ink. Accordingly, the guide piece 92 moves the lever arm 77 from the third guide position 90 to the first guide position 88. When the lever arm 77 is moved to the first guide position 88, the second switching gear 72 is meshed with the third transmission gear 103. That is, the releasing of the pressure between the surfaces and the matching of the rotational phases are performed by controlling of the ASF motor 66, so that the second switching gear 72 is meshed with the third transmission gear 103. Further, the carriage 62 is moved to the maintenance area M1, so that the guide piece 92 moves the lever arm 77 from the first guide position 88 to the second guide position 89. In accordance with this movement of the lever arm 77, the set of the first switching gear 71 and the second switching gear 72 is returned to the third specific position, so that the second switching gear 72 is disengaged from the third transmission gear 103 to be meshed with the second transmission gear 102. Also in these operations, the releasing of the pressure between the surfaces of the second switching gear 72 and the third transmission gear 103 and the matching of the rotational phases of the second switching gear 72 and the second transmission gear 102 are performed by the controlling of the ASF motor 66 in a manner similar to that described above. On the other hand, after the first switching gear 71 is disengaged from the first transmission gear 101, the first switching gear 71 is not meshed with any of the transmission gears 101, 102, 103. Thus, the matching of the rotational phases does not need to be performed by the LF motor 65 which is for feeding the recording sheets. Consequently, the switching mechanism 70 is easily controlled in transmitting the drive power to the selected one or ones of the driven portions.

As shown in FIG. 8 and Table 1, in accordance that the carriage 62 is moved to the position just above the nozzle cap 57, the guide piece 92 is brought into contact with the lever arm 77, thereby moving the lever arm 77 to the third guide position 90 shown in FIG. 4. Thus, the set of the first switching gear 71 and the second switching gear 72 is moved or slid to the first specific position by the elastic force of the coil spring 95B in the direction indicated by the arrow 84B in the state in which the carriage contacts the lever arm 77. In other words, when the set of the first switching gear 71 and the second switching gear 72 is slid between one and another of the specific positions, the first transmission gear 71 is switched between a state in which the first transmission gear 101 is meshed with the first switching gear 71 and a state in which the first transmission gear 101 is not meshed with the first switching gear 71, while the second transmission gear 72 is held in a state in which the second transmission gear 72 is meshed with the second switching gear 72. It is noted that, in accordance that the lever arm 77 is moved to the third guide position 90, the first switching gear 71 is brought into contact with the limiting surface 105 of the first transmission gear 101, thereby being limited from further sliding or moving in the direction indicated by the arrow 84B, so that the set of the first switching gear 71 and the second switching gear 72 is held at the first specific position. The input lever 74 and the engaging member 75 are further moved with the carriage 62 in the direction indicated by the arrow 84B, so that the engaging member 75 is disengaged from the first switching gear 71, and the lever arm 77 is moved to the third guide position 90.

At the first specific position, the first switching gear 71 is meshed with the first transmission gear 101. When the first switching gear 71 is meshed with the first transmission gear 101, a slight forward and reverse rotations of the first switching gear 71 with respect to the first drive gear are alternately repeated in order to match rotational phases of the first switching gear 71 and the first transmission gear 101. Thus, the rotational phases of the first switching gear 71 and the first transmission gear 101 are matched with each other, so that the first switching gear 71 is slid on the support shaft 73 by the elastic force of the coil spring 95B to be meshed with the first transmission gear 101. The rotation of the second switching gear 72 and the forward and reverse rotations of the first switching gear 71 for matching the rotational phases can be controlled independently of each other. That is, when the first switching gear 71 is forwardly and reversely rotated, the second switching gear 72 can be at rest and be rotated in one direction.

Further, at the first specific position, the second switching gear 72 is held to be meshed with the second transmission gear 102 while being moved or slid on the support shaft 73. That is, when the set of the first switching gear 71 and the second switching gear 72 is moved from the third specific position to the first specific position, the second switching gear 72 is slid on the support shaft 73 while being meshed with the second transmission gear 102. Thus, the rotation of the second switching gear 72 does not need to be controlled for matching the rotational phases.

The carriage 62 can be reciprocated in the maintenance area M1 without moving the set of the first switching gear 71 and the second switching gear 72 which is positioned at the first specific position. The drive power of the LF motor 65 is transmitted to the sucking pump of the purging device 55 and so on via the first switching gear 71 and the first transmission gear 101, so that operations relating to the maintenance of the MFD 10 are performed On the other hand, the drive power of the ASF motor 66 is transmitted to the cap-lifting-up mechanism of the purging device 55 via the second switching gear 72 and the second transmission gear 102, so that the capping operation of the recording head 61 is performed.

Effects of this MFD 10

In this MFD 10, the first switching gear 71 and the second switching gear 72 are supported by the support shaft 73 so as to be slidable in the predetermined direction in which the carriage 62 is reciprocated. Further, the guide piece 92 of the carriage 62 is brought into contact with the input lever 74, whereby the first switching gear 71 and the second switching gear 72 are moved against the elastic force of the coil spring 95A, so as to be selectively positioned at one of the first, the second, and the third specific position. Thus, a load received by the carriage 62 when the first switching gear 71 and the second switching gear 72 are moved from one to another of the first, the second, and the third specific, position can be reduced. Consequently, a smaller-sized CR motor can be employed as a drive source for reciprocating the carriage 62, thereby reducing power consumption.

In accordance with the switch of the positions of the set of the first switching gear 71 and the second switching gear 72, when the first switching gear 71 is meshed with the first transmission gear 101, the second switching gear 72 is maintained to be meshed with the second transmission gear 102. Thus, a state can be taken in which the first switching gear 71 is driven to be rotated to match the rotational phases of the first switching gear 71 and the first transmission gear 101 while the second switching gear 72 is held to be stopped. Further, when the second switching gear 72 is disengaged from the third transmission gear 103 to be meshed with the second transmission gear 102, the first switching gear 71 is located at a position corresponding to the spacer 106. Thus, a state can be taken in which the second switching gear 72 is driven to be rotated to release the pressure between the surfaces of the second switching gear 72 and the third transmission gear 103 and matching the phases of the second switching gear 72 and the second transmission gear 102 while the first switching gear 71 is held to be stopped. Consequently, since flexibility of the control of the respective rotations of the first switching gear 71 and the second switching gear 72 is increased, the meshes of the gears for transmitting the drive power of the two motors (i.e., the LF motor 65 and the ASF motor 66) to the selected one or ones of the driven portions can be switched at a suitable timing without driving both of the two motors. Also, the matching of the first switching gear 71 and the matching of the second switching gear 72 do not need to be performed at the same time, thereby reducing a time for controlling the respective rotations of the first switching gear 71 and the second switching gear 72, and thereby improving a reliability of the drive-power transmitting system.

In this MFD 10, the carriage 62 can be reciprocated in the maintenance area M1 without moving the set of the first switching gear 71 and the second switching gear 72 which is positioned at the first specific position. Further, the carriage 62 can be reciprocated in the image recording area A1 without moving the set of the first switching gear 71 and the second switching gear 72 which is positioned at the second specific position. When the set of the first switching gear 71 and the second switching gear 72 is positioned at the first specific position, the drive power is transmitted via the switching mechanism 70 for performing the maintenance of the MFD 10. When the set of the first switching gear 71 and the second switching gear 72 is second, and the third specific position are set in the switching mechanism 70, but a number of the specific positions may be changed without departing from the scope and spirit of the invention. Further, in the above-described embodiment, the spacer 106 is provided between the first transmission gear 101 and the second transmission gear 102, but another transmission gear different from the transmission gears 101, 102, 103 may be disposed at the position corresponding to the position at which the spacer 106 is provided. Furthermore, in the above-described embodiment, each of a positional relationship of the first switching gear 71 and the second switching gear 72, and a positional relationship of the first transmission gear 101, the second transmission gear 102, and the third transmission gear 103 is relative, and thus each of the positional relationships may be changed. Furthermore, it should be understood that the driven portions to which the drive power is transmitted via the drive-power transmitting system are not limited to those of the above-described embodiment.

What is claimed is:

1. An image recording apparatus comprising:

a carriage which carries a recording head mounted on the carriage and which is reciprocable in a predetermined direction across an image recording area in which the recording head performs an image recording operation on a recording medium and a maintenance area in which a maintenance of the recording head is performed;

a plurality of driven portions;

a first drive source and a second drive source which generate drive power for driving the plurality of the driven portions; and a drive-power transmitting system configured to transmit the drive power of the first and the second drive source to the plurality of the driven portions, wherein the drive-power transmitting system includes:

a shaft having an axis extending in an axial direction parallel to the predetermined direction;

a first switching gear and a second switching gear supported by the shaft so as to be rotatable about the axis of the shaft and slidable in the axial direction, and respectively driven to be rotated by the drive power of the first drive source and by the drive power of the second drive source;

a first transmission gear disposed so as to be meshed with the first switching gear in accordance with a position of the first switching gear in the axial direction, and configured to transmit, by being meshed with the first switching gear, the drive power of the first drive source, to a first driven portion as one of the plurality of the driven portions which is driven in relation to the maintenance of the recording head;

a second transmission gear disposed so as to be meshed with the second switching gear in accordance with a position of the second switching gear in the axial direction, and configured to transmit, by being meshed with the second switching gear, the drive power of the second drive source, to a second driven portion as one of the plurality of the driven portions which is different from the first driven portion and which is driven in relation to the maintenance of the recording head;

a third transmission gear disposed so as to be meshed with the second switching gear in accordance with the position of the second switching gear in the axial direction, and configured to transmit, by being meshed with the second switching gear, the drive power of the second drive source, to a third driven portion as one of the plurality of the driven portions which is different from the first and the second driven portion and which is driven in relation to a feeding of the recording medium in the image recording operation performed by the recording head; and a switching-gear positioning mechanism configured to slide the first and the second switching gear together with each other in the axial direction depending upon a position of the carriage, wherein when the carriage is positioned in the maintenance area, the switching-gear positioning mechanism positions a set of the first and the second switching gear at a first specific position as a position at which the first switching gear is meshed with only the first transmission gear while the second switching gear is meshed with only the second transmission gear, and wherein when the carriage is positioned in the image recording area, the switching-gear positioning mechanism positions the set of the first and the second switching gear at a second specific position as a position at which the first switching gear is not meshed with any of the first transmission gear, the second transmission gear, and the third transmission gear while the second switching gear is meshed with only the third transmission gear.

2. The image recording apparatus according to claim 1, wherein the drive-power transmitting system includes another shaft disposed so as to be parallel to the shaft, and wherein the first transmission gear, the second transmission gear, and the third transmission gear are arranged along the another shaft and supported by the another shaft so as to be rotatable about an axis of the another shaft.

3. The image recording apparatus according to claim 2, wherein the first transmission gear is meshed, at a peripheral surface thereof with the first switching gear while each of the second transmission gear and the third transmission gear is meshed, at a peripheral surface thereof, with the second switching gear.

4. The image recording apparatus according to claim 1, wherein the switching-gear positioning mechanism includes a lever member supported by the shaft so as to be slidable in the axial direction thereof and configured such that the first and the second switching gear are slid in the axial direction by a contacting and a pressing of the carriage with respect to the lever member.

5. The image recording apparatus according to claim 4, wherein the switching-gear positioning mechanism includes a forcing member which forces the lever member in one of opposite directions parallel to the axial direction, and wherein the switching-gear positioning mechanism is configured to slide the first and the second switching gear, by the contacting and the pressing of the carriage with respect to the lever member in the other of the opposite directions together with the lever member against a force of the forcing member in the other of the opposite directions.

6. The image recording apparatus according to claim 5, wherein the switching-gear positioning mechanism includes another forcing member which is different from the forcing member and which presses the first and the second switching gear toward the lever member by forcing the first and the second switching gear in the other of the opposite directions, and wherein the switching-gear positioning mechanism is configured such that the first and the second switching gear are slid together with the lever member by a force of the another forcing member.

7. The image recording apparatus according to claim 4, wherein when the carriage is moved from one of the image recording area and the maintenance area to the other, the lever member is disposed at a position at which a state in which the carriage contacts the lever member and a state in which the carriage does not contact the lever member are switched.

8. The image recording apparatus according to claim 7, wherein the switching-gear positioning mechanism is configured to establish the state in which the carriage contacts the lever member when the carriage is moved from the image recording area to the maintenance area, and configured to position the set of the first and the second switching gear at the first specific position in the state in which the carriage contacts the lever member, and wherein the switching-gear positioning mechanism is configured to establish the state in which the carriage does not contact the lever member when the carriage is moved from the maintenance area to the image recording area, and configured to position the set of the first and the second switching gear at the second specific position in the state in which the carriage does not contact the lever member.

9. The image recording apparatus according to claim 1, wherein the recording head is of an ink-jet type in which the recording head performs the image recording operation by ejecting ink through nozzles of the recording head, and wherein one of the first driven portion and the second driven portion is a driven portion that moves a cap which covers the nozzles of the recording head, toward and away from the recording head in a state in which the carriage is positioned in the maintenance area.

10. The image recording apparatus according to claim 9, wherein the second driven portion is the driven portion that moves the cap which covers the nozzles of the recording head, toward and away from the recording head in the state in which the carriage is positioned in the maintenance area, and wherein the switching-gear positioning mechanism is configured to position the set of the first and the second switching gear at a third specific position as a position at which the first switching gear is not meshed with any of the first transmission gear, the second transmission gear, and the third transmission gear while the second switching gear is meshed with only the second transmission gear.

11. The image recording apparatus according to claim 10, wherein the third specific position is located between the first specific position the second specific position in the axial direction.

12. The image recording apparatus according to claim 1, wherein the plurality of the driven portions include another driven portion which is different from the first driven portion, the second driven portion, and the third driven portion and which is driven to switch from one to another of paths through which the recording medium is to be fed upon the image recording operation performed by the recording head, wherein in a state in which the second transmission gear and the second switching gear are meshed with each other, the drive power of the second drive source is permitted to be transmitted to a selected one of the second driven portion and the another driven portion.

13. The image recording apparatus according to claim 1, wherein the plurality of the driven portions include another driven portion which is different from the first driven portion, the second driven portion, and the third driven portion and which is driven in relation to the feeding of the recording medium upon the image recording operation performed by the recording head, wherein the drive power of the first drive source is transmitted to the another driven portion which is driven in relation to the feeding of the recording medium, irrespective of whether the set of the first and the second switching gear is positioned at the first specific position or the second specific position by the switching-gear positioning mechanism.

* * * * *